US011598547B2

(12) United States Patent
Nilsson et al.

(10) Patent No.: US 11,598,547 B2
(45) Date of Patent: Mar. 7, 2023

(54) SYSTEMS AND METHODS FOR RECONFIGURING ROOMS IN AN AREA IN A BUILDING

(71) Applicant: SCHNEIDER ELECTRIC BUILDINGS, LLC, Rockford, IL (US)

(72) Inventors: Leif Roger Torbjörn Nilsson, Södra Sandby (SE); Lars-Eric Ragnar Assarsson, Klagshamn (SE); Andreas Karl Fredrik Håkansson, Södra Sandby (SE)

(73) Assignee: Schneider Electric Buildings Americas, Inc., Carrollton, TX (US)

( * ) Notice: Subject to any disclaimer, the term of this patent is extended or adjusted under 35 U.S.C. 154(b) by 0 days.

(21) Appl. No.: 17/116,764

(22) Filed: Dec. 9, 2020

(65) Prior Publication Data

US 2021/0172640 A1 Jun. 10, 2021

Related U.S. Application Data

(60) Provisional application No. 62/946,428, filed on Dec. 10, 2019.

(51) Int. Cl.
*G05B 19/042* (2006.01)
*F24F 11/63* (2018.01)

(52) U.S. Cl.
CPC ............ *F24F 11/63* (2018.01); *G05B 19/042* (2013.01); *G05B 2219/2614* (2013.01)

(58) Field of Classification Search
CPC ......... F24F 11/63; F24F 11/54; G05B 19/042; G05B 2219/2614; G05B 2219/25011; G05B 15/02
See application file for complete search history.

(56) References Cited

U.S. PATENT DOCUMENTS

| | | | | |
|---|---|---|---|---|
| 9,353,514 | B1 * | 5/2016 | Wine | G06Q 50/08 |
| 2006/0044152 | A1 | 3/2006 | Wang | |
| 2008/0313299 | A1 | 12/2008 | Ebbe et al. | |

(Continued)

FOREIGN PATENT DOCUMENTS

WO 2016073272 A1 5/2016

OTHER PUBLICATIONS

International Search Report and Written Opinion dated Apr. 16, 2021 for corresponding International Application No. PCT/US20/64085.

*Primary Examiner* — Michael W Choi
(74) *Attorney, Agent, or Firm* — Locke Lord LLP

(57) ABSTRACT

System and methods for reconfiguring rooms or zones within an area in building automation are disclosed. One of the methods includes receiving a user request to group together at least a first segment and a second segment in a zone and verifying the user request using one or more rules. Upon verification of the user request, the method automatically links each object in the master segment to the corresponding object in the second segment to create the zone. Within this zone, a control program of the master segment provides a synchronized control of the environmental control equipment in the master segment and the second segment. This method of zoning provides the flexibility to perform rezoning on the fly without requiring traditional engineering, redesign or reprogramming.

30 Claims, 28 Drawing Sheets

(56) References Cited

U.S. PATENT DOCUMENTS

| | | | | |
|---|---|---|---|---|
| 2016/0092795 | A1* | 3/2016 | Gupta | G06Q 10/02<br>705/5 |
| 2016/0320760 | A1* | 11/2016 | Brun | G05B 19/042 |
| 2017/0177747 | A1* | 6/2017 | Atherton | G06F 30/13 |
| 2017/0251536 | A1 | 8/2017 | Deixler | |
| 2019/0086889 | A1 | 3/2019 | Rimmer et al. | |
| 2019/0236039 | A1* | 8/2019 | Meruva | G06F 13/4282 |
| 2020/0371488 | A1* | 11/2020 | Ackmann | G05B 19/0426 |

* cited by examiner

800F

SYSTEMS AND METHODS FOR RECONFIGURING ROOMS IN AN AREA IN A BUILDING

CROSS-REFERENCE TO RELATED APPLICATION(S)

The present application claims priority to and benefit from U.S. Provisional Patent Application No. 62/946,428 filed on Dec. 10, 2019 which is hereby incorporated by reference in its entirety.

TECHNICAL FIELD

The present disclosure relates to building automation and control, and more particularly to methods and systems for reconfiguring rooms in an area in a building.

BACKGROUND

A building management system (BMS) is a computer-based system that monitors and controls a building's technical systems and services such as heating, ventilation and air conditioning (HVAC), lighting, blinds or shades, security systems, access control systems, fire, smoke detection and alarms, hydraulics, and so on. For example, an HVAC system provides monitoring and control of HVAC functions such as heating and cooling. Similarly, a lighting control system provides monitoring and control of room lighting functions, a blind control system provides monitoring and control of window/door blinds, and so forth.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION OF THE EMBODIMENTS

The present disclosure describes systems and methods for dynamically reconfiguring rooms in an area (hereinafter "disclosed system" or "zoning system").

In a typical construction, buildings are initially instrumented with capabilities for heating and cooling, lights, blinds, and so on without knowing how a floor is going to be laid out into different areas or rooms. Rooms are typically configured later, usually in consultation with the building's occupant. Once the rooms are defined (e.g., by adding a wall) based on the building occupants' needs, control systems for regulating the environmental conditions (e.g., HVAC, lights, blinds) are within a space are commissioned for each of the rooms. This process is called zoning and involves a fair amount of manual engineering effort including, for example, adapting of control programs or applications in order to create a functional room (i.e., a room with a functioning environmental control system).

After some time, a need may arise to reconfigure or rearrange rooms in the floor. This may be due to any number of reasons. For example, the building occupant's needs may have changed (e.g., need more conference rooms than individual office rooms), the building or floor may be undergoing remodeling, or a new building occupant may require a different layout of rooms. This reconfiguring or rearranging of rooms called rezoning typically requires physical rewiring, relocation of equipment, manual adapting of control programs/applications, re-commissioning and so on. Thus, rezoning also involves a significant amount of manual engineering effort, specialized engineering tools and skilled personnel, all of which can be time consuming and costly.

Embodiments of the disclosed system solve the problems described above by providing a flexible way to perform rezoning, on the fly, without the need of traditional or significant re-engineering. For example, the disclosed system enables reconfiguration of rooms without a user having to create any bindings or having to move objects in a database, both of which require specialized knowledge and engineering tools. Instead, the disclosed system enables a user to simply select, from a graphical user interface, segments to be zoned or grouped together. A zoning manager in a server then automatically creates the necessary connections or bindings between objects to enable synchronized control of environmental control equipment in the room. Details of the various embodiments of the disclosed system will now be described in references to the drawings.

Figure 1:
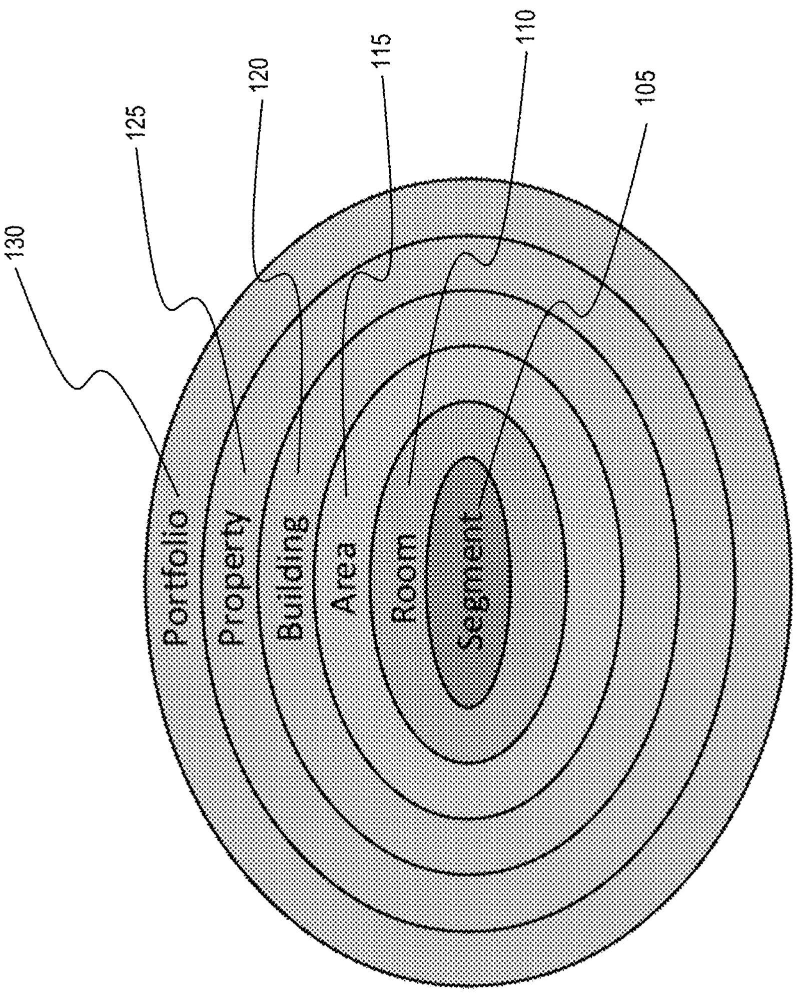
FIG. 1 is a diagram illustrating relationships between key terminologies used herein.

FIG. 1 is a diagram illustrating relationships between key terminologies used herein. A segment 105 is the smallest logical unit describing a space. A room 110 (or zone) comprises one or more segments 105. An area 115 comprises one or more rooms 110. A building 120 comprises one or more areas 115. A property 125 comprises one or more buildings 120. Finally, a portfolio 130 comprises one or more properties. In some embodiments, segments 105 within an area 115 may be identified with a view towards flexibility, engineering efficiency (e.g., tradeoff among cost and reusability and maintainability factors) and performance and scalability.

Figure 2:
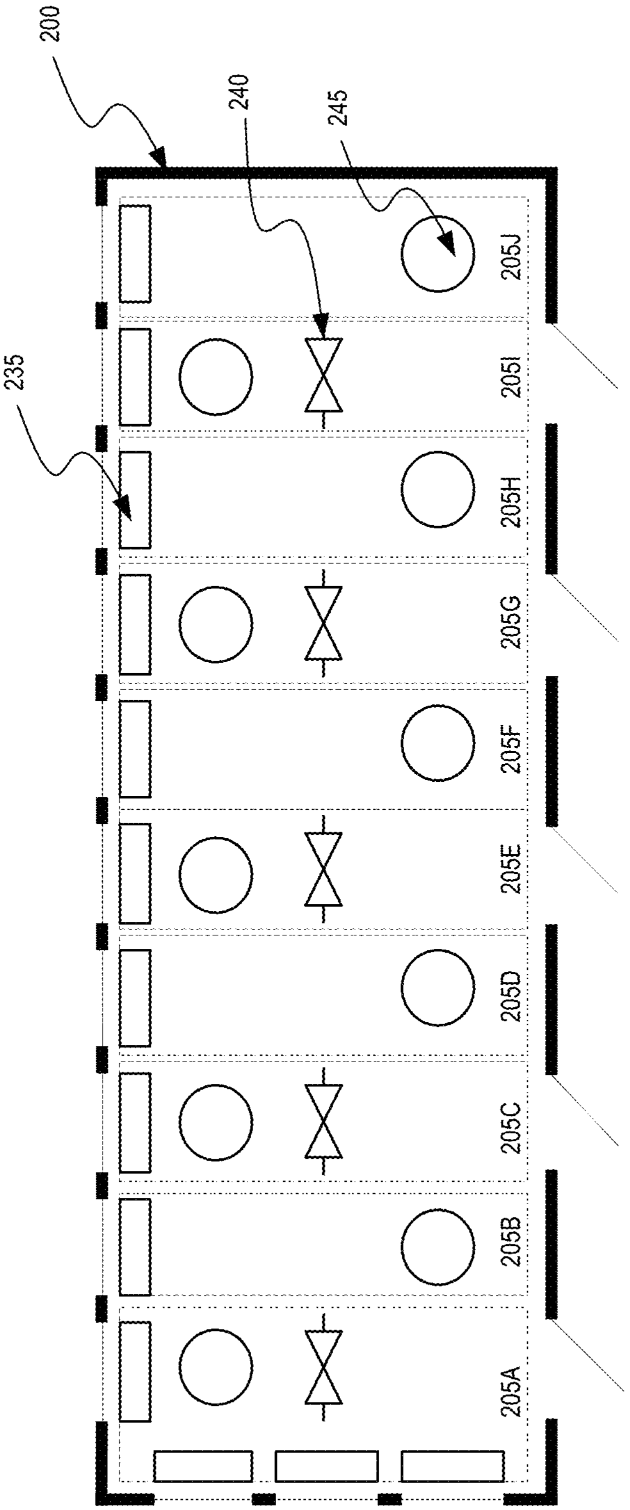
FIG. 2 is a diagram illustrating an example floor plan of a building.

FIG. 2 is a diagram illustrating an example floor plan of a building. The floorplan 200 includes a number of environmental control equipment (e.g., blinds 235, a lights 245 and HVAC 240). As used herein, environmental control equipment includes devices used to regulate environmental conditions within a space. By way of example only, environmental control equipment can include lighting equipment (i.e., lights), shading equipment (e.g., blinds) and HVAC equipment. In some embodiments, environmental control equipment may also include other devices such as room units/thermostats, fire/safety equipment, access equipment, and the like. The floorplan 200 also includes logical items or segments 205A-J. As shown, a segment may include or be associated with one or more environmental control equipment. For example, segment 205A includes four blinds 235, one light 245 and one HVAC equipment 240, while segment 205J includes one blind 235 and one light 245 equipment. One or more of these segments can be grouped together to create or define a room.

Figure 3:
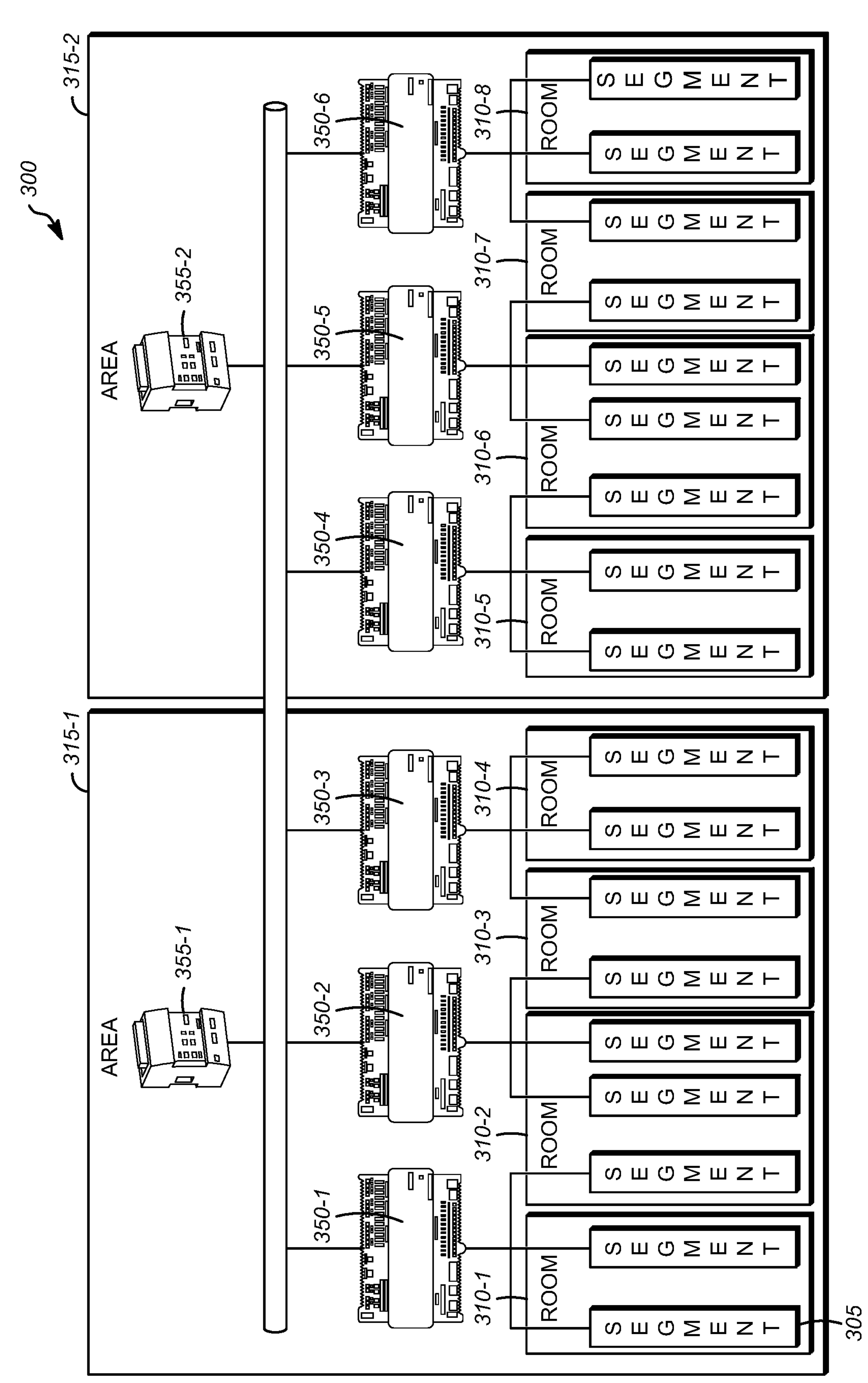
FIG. 3 is a diagram illustrating an example architecture of the disclosed system.

FIG. 3 is a diagram illustrating an example architecture of the disclosed system. As illustrated, the smallest logical unit, segments 305 can be grouped or zoned together to create a room 310. For example, room 310-1 is formed by grouping together two segments 305. From hardware perspective, a controller 350 may host one or more rooms 310. More specifically, a controller 350 may host one or more segments, and those segments may be grouped together into one or more rooms. During the zoning process, the association or links between segments and rooms can be created or rearranged, and further operation of environmental control equipment can be synchronized.

Referring to FIG. 3, room controller 350-1 hosts three segments 305, two of which are part of room 310-1 and one is part of room 310-2. The room controllers 350 own their own environmental control equipment and drive them. For example, one segment in room 310-1 may have a blind controller to control opening and closing of a blind. The blind controller would be owned and driven by the room controller 350-1. By way of example, room controller 350 can be a Room Purpose Controller (RP-C) from Schneider Electric.

In some embodiments, the disclosed system includes one or more automation servers 355 or area controllers. An automation server device 355, in some embodiments, can perform functionalities such as executing control logic, communications for advanced display, trend logging, alarm supervision, supporting communication and connectivity to the I/O and field buses, and the like. One example of an automation server device 355 is AS-P from Schneider Electric. Referring to FIG. 3, each automation server device 355 may be in communication with one or more room controllers 350 and may be responsible for management, monitoring and control of room controllers associated with an area. For example, area controller 355-1 may be responsible for monitoring and control of area 315-1 which includes room controllers 350-1, 350-2 and 350-3. In some other embodiments, an automation server may host two or more areas. In some embodiments, grouping across areas (or between automation servers) may be possible. It should be noted that in some embodiments, it is possible to perform rezoning only within an area. For example, a segment from area 315-1 cannot be grouped together with a segment from area 315-2.

Figure 4A:
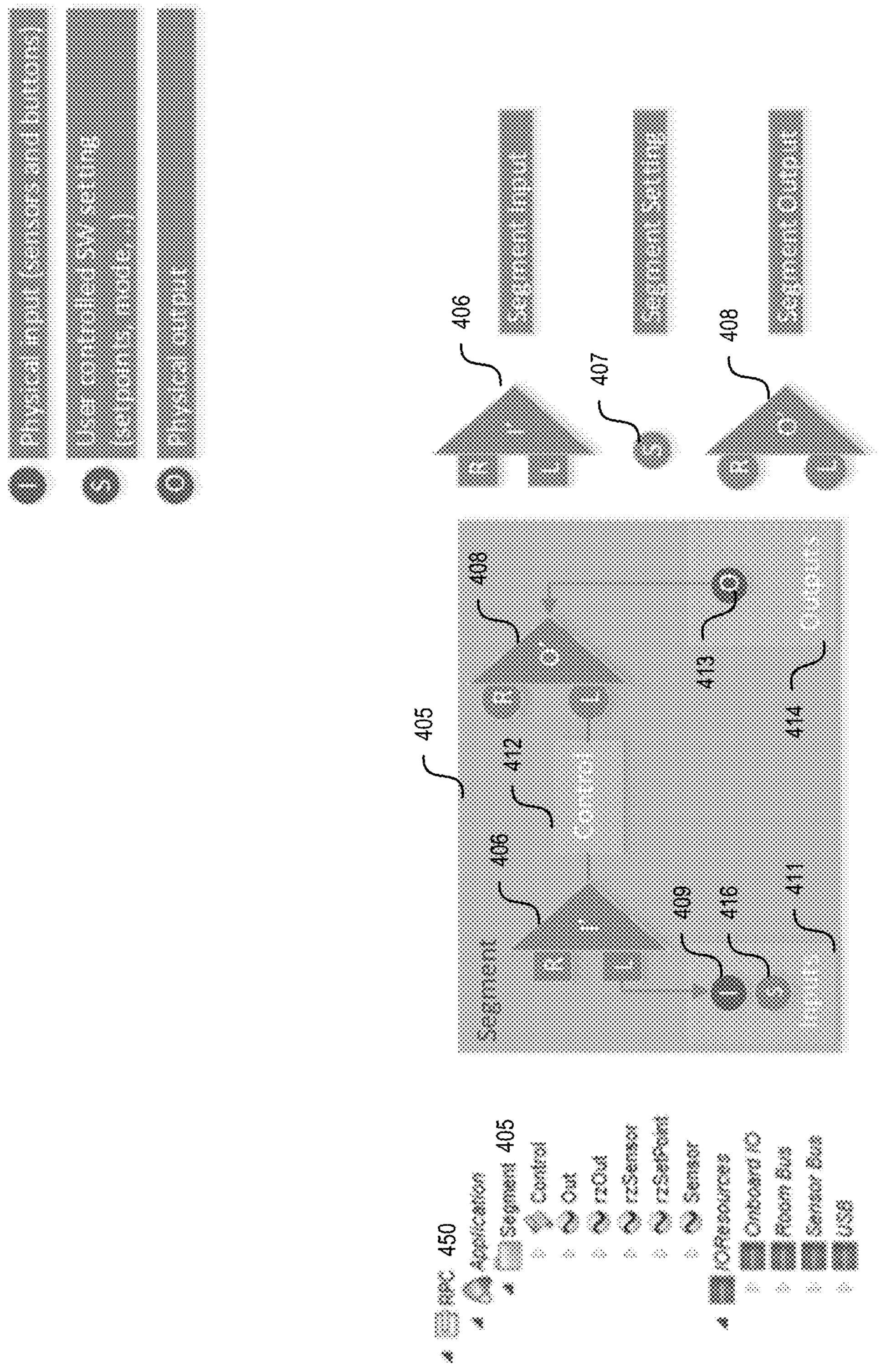
FIGS. 4A and 4B are diagrams illustrating a segment in accordance with various embodiments of the disclosed system.

FIG. 4A is a diagram illustrating a segment object in accordance with some embodiments of the disclosed system. As used herein, "I" is a physical input 409 (e.g., sensors, buttons), "S" is a user-controlled software setting 416 (e.g., set points, mode), "O" is a physical output 413, "L" is a local reference and "R" is a remote reference.

A room controller (e.g., RPC 450) hosts one or more segment objects 405. Each segment object 405 may comprise a segment input object 406, a segment setting object 407, a segment output object 408. Some segment objects may include a control program 412.

The segment input object 406 includes remote property (R) and local property (L) reference lists, an algorithm and an output. The algorithm can include, but is not limited to "OR" operation, "AND" operation, average, sum, maximum or minimum, toggle, and/or the like. In some embodiments, the algorithm can be more complex such as an algorithm for people counting across segments the output of which may impact the behavior of the environmental control equipment. In various embodiments, the inputs can be analog or binary (i.e., digital). The segment output object 408 can be an analog value, binary value, integer value, etc. For example, for light and blind control, the output can be a percentage (50%). In some embodiments, each output object 408 may have a remote (R) and local (L) property references.

The segment setting object 407 may include one or more user-controllable software settings 416 such as setpoints, operating modes, etc. By way of an example, a temperature set point that a user can use to configure an application is a user-controllable software setting. Another example of a user-controllable software setting is level of blind or light (open a blind at 50%). In some embodiments, settings can be set through an external human machine interface (HMI), via a reset timer, mobile application, etc.

Typically, settings 416 and physical inputs 409 are inputs 411 to the control program 412 which in turn controls the outputs 414. As shown, a segment input 406 may be placed in between the inputs 411 and the control program 412, and a segment output 408 between the control program 412 and the physical outputs 414. The settings are changed into a segment setting 407 which enables the setting to be shared in multiple places, including with a room unit (e.g., a thermostat).

In some embodiments, when a segment object is offline during rezoning, then the new configurations for that segment may need to be downloaded (to the room controller) once it is back online. Further, remote references of segment objects 405 may be hidden in some embodiments.

Figure 4B:
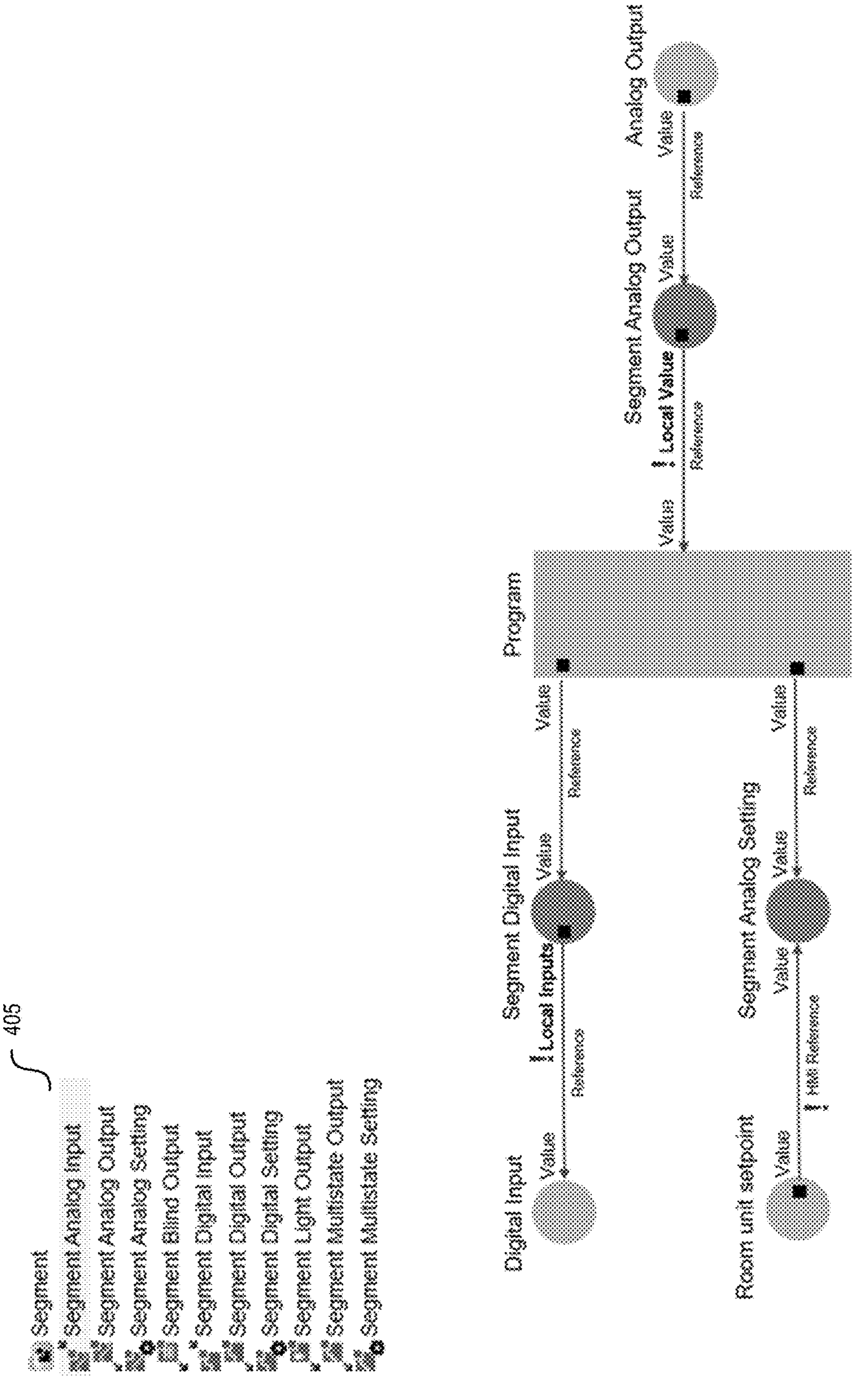

In some embodiments, a segment object may be represented as a segment folder as depicted in FIG. 4A and further in FIG. 4B. A segment folder 405 may include segment points. Segment points may include a segment analog input, a segment analog output, segment analog setting, segment blind output, segment digital input, segment digital output, segment digital setting, segment light output, segment multistate output and/or segment multistate setting. These objects enable synchronization of applications (e.g., to control environmental equipment) in runtime. To prepare an application for zoning, segment points can be inserted in between the program (i.e., control program) and the actual inputs and outputs. Referring to FIG. 4B, a segment digital input is inserted in between the digital input and the program, a segment analog setting is inserted in between the room unit setpoint (actual setting) and the program. Similarly, a segment analog output is inserted in between the program and the actual analog output. In some embodiments, the properties of a segment folder include a role which describes the current role of the segment. A role can be master, member/slave or standalone. Master capable is a property that can be set to "true" if the segment can act as a master segment. Master is an object reference to the master segment.

Figure 4C:
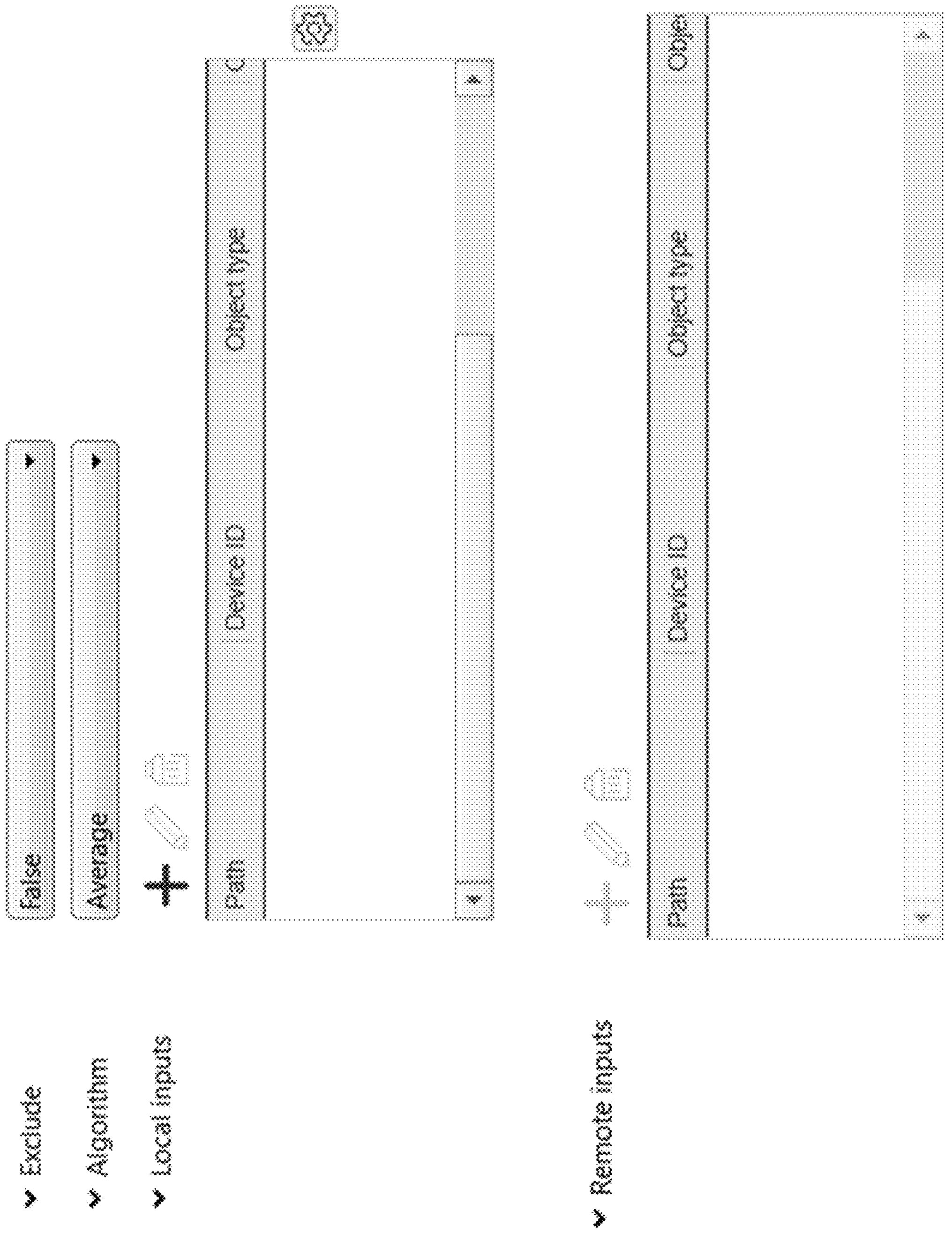
FIGS. 4C, 4D and 4E are diagrams illustrating segment inputs, segment outputs and segment settings in accordance with various embodiments of the disclosed system.
Figure 4D:
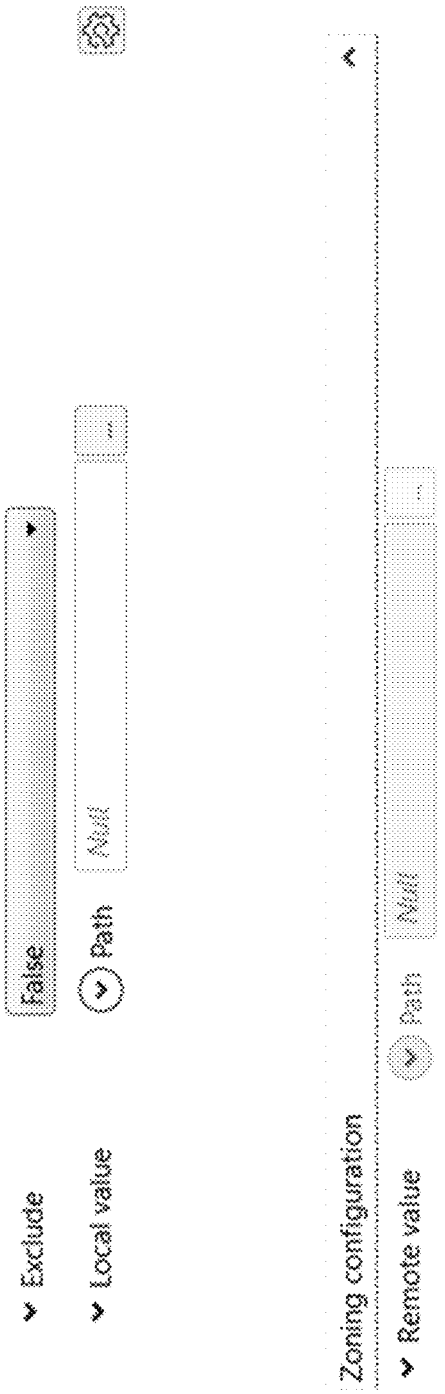
Figure 4E:
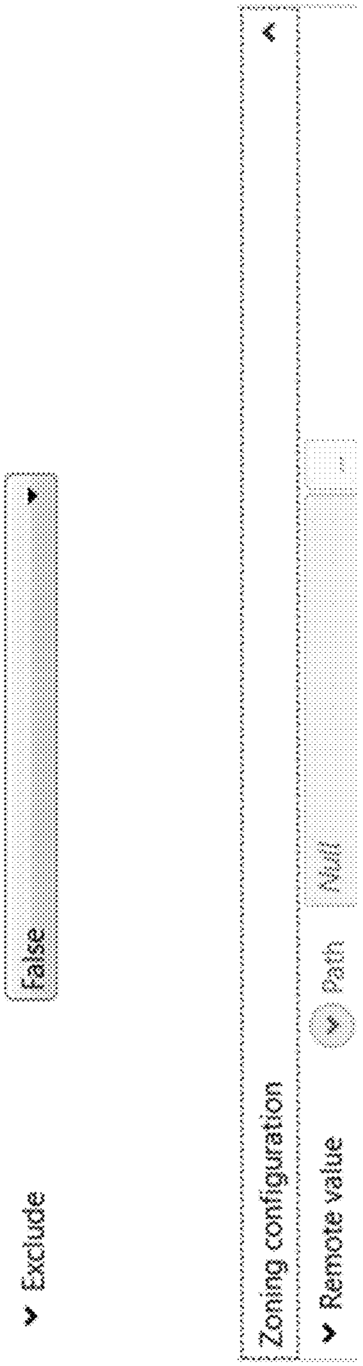

FIG. 4C-E are diagrams illustrating configuring of segment inputs, segment outputs and segment settings in accordance with some embodiments of the disclosed system. As previously described, segment inputs have a list of property references to the value of the actual input points called Local Inputs. It also has a list of Remote Inputs which is handled by the Zoning Manager. The algorithm specifies how the input values are to be calculated. Both Local and Remote inputs may be included in this calculation. Input values from offline room controllers are not included in the calculation to avoid stale data (e.g., temperature readings) from skewing the calculation (e.g., average). The Exclude property can be set to "true" if this object is not to be a part of the zoning. For example, a user may want to use this object to handle multiple input values, with a calculation, but may not want to synchronize it with inputs in other segments.

Referring to FIG. 4D, as described above a segment output has a property reference to a value, called Local Value (or Local Reference), which typically is an output value of a program. It also has a Remote Value (or Remote Reference) which is handled by the Zoning Manager. Remote value references the value of the corresponding segment output in the master segment. The remote value from the master segment overrides the local value in the member segment. If the room controller with the master segment goes offline, Local Value is used until the master is online again. The Exclude property can be set to "true" if a user does not want this object to be a part of the zoning.

Referring to FIG. 4E, segment settings may have local value references for the purpose of resetting and Remote Value, which is handled by the Zoning Manager. It is the values that are bound to the Segment Setting that hold the reference to the value of the Segment Setting. This binding will result in a so called HMI Reference and the value of the Segment Setting and, for example, the setpoint in a room unit will be synchronized. Segment settings with Remote Value references will also be included in the synchronization. The Exclude property can be set to "true" if a user does not want this object to be a part of the zoning.

Referring back to FIG. 4B, the segment folder can include segment light and blind outputs which have multiple Local Values, and which are typically bound to a program. The segment light and blind objects can be used to control lights and blinds in some embodiments. The Remote reference, which is handled by the Zoning Manager, is an object reference. The implementation uses this object reference to transfer multiple values from the master segment light/blind output to the member segment light/blind output. The Exclude property can be set to "true" if a user doesn't want this object to be a part of the zoning.

Figure 5A:
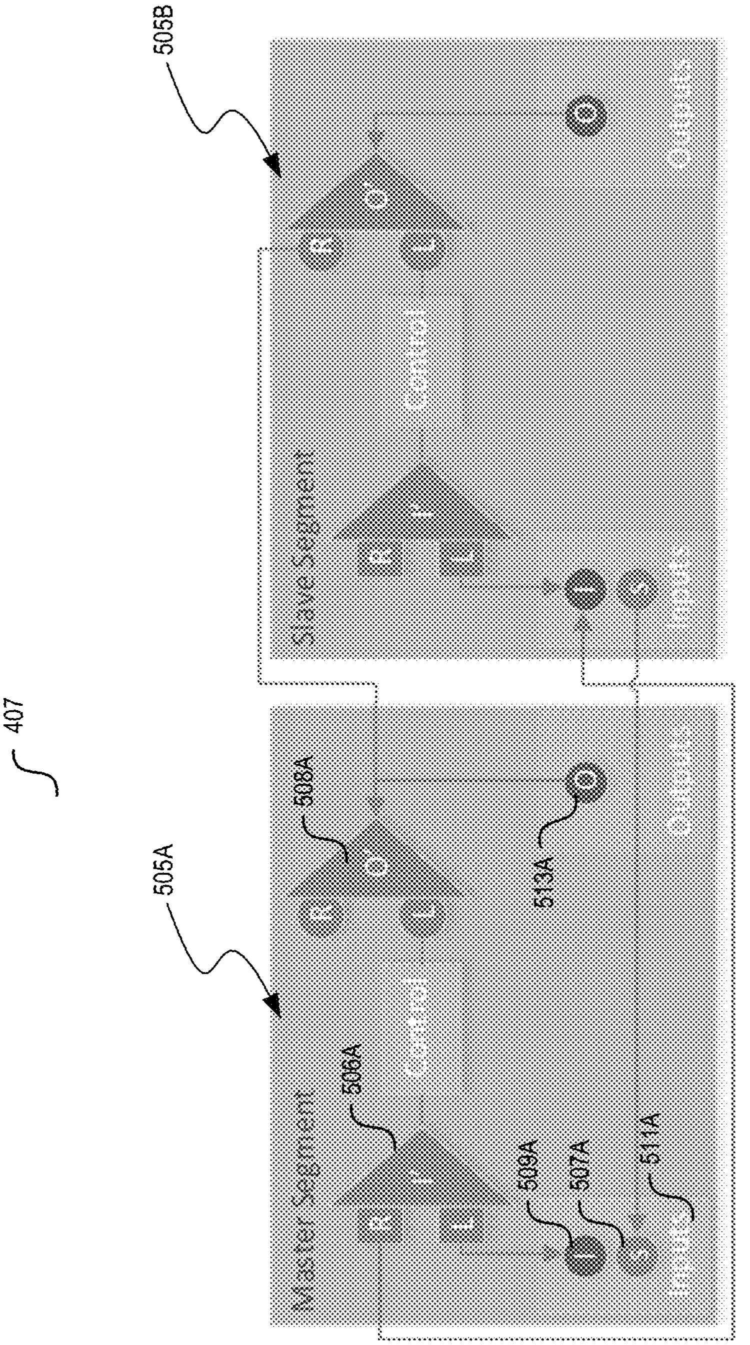
FIGS. 5A, 5B and 5C are diagrams illustrating an example of zoning of two segments in accordance with various embodiments of the disclosed system.

FIG. 5A is a diagram illustrating an example of zoning of two segments in accordance with some embodiments. For any two or more segments to be grouped together in a zone, one segment may be designated a master (or primary) and the other a slave (or secondary). Any segment that has a control program can be designated a master segment. Conversely, a segment that does not have a control program may not be designated a master segment. Each of the master segment 505A and the slave segment 505B, as shown, includes a control program, and as such, either segment is capable of being a master segment.

In the example shown, the physical input (I) of the slave segment 505B is connected to the remote reference (R) of the master segment input object 506A. The local reference (L) of the master input segment object 506A is connected to the inputs 511A which includes a local physical input (I) 509A and the setting object 507A. Furthermore, the setting object 507A is shared between the master and slave segments. The remote reference (R) of the slave segment output object 508B is connected to the output of the master segment output object 508A which drives the physical output 513A.

Operationally, this manner of connecting the master and slave segments means that the input to the control program of the master segment can be from the master segment or the slave segment, and that the output of the control program of the master segment drives the outputs of both the master and slave segments. In other words, in this example, the control program of the slave segment does not determine the outputs, and as long as the master segment is operational, the slave segment 505B will be controlled by the master segment 505A. For example, when a user presses a button (i.e., physical input) in the slave segment 505B to turn on a light, the master segment 505A responds to the input by turning on light in the master segment 505A as well as the slave segment 505B thereby providing synchronized control of lights in the two segments.

Figure 5B:
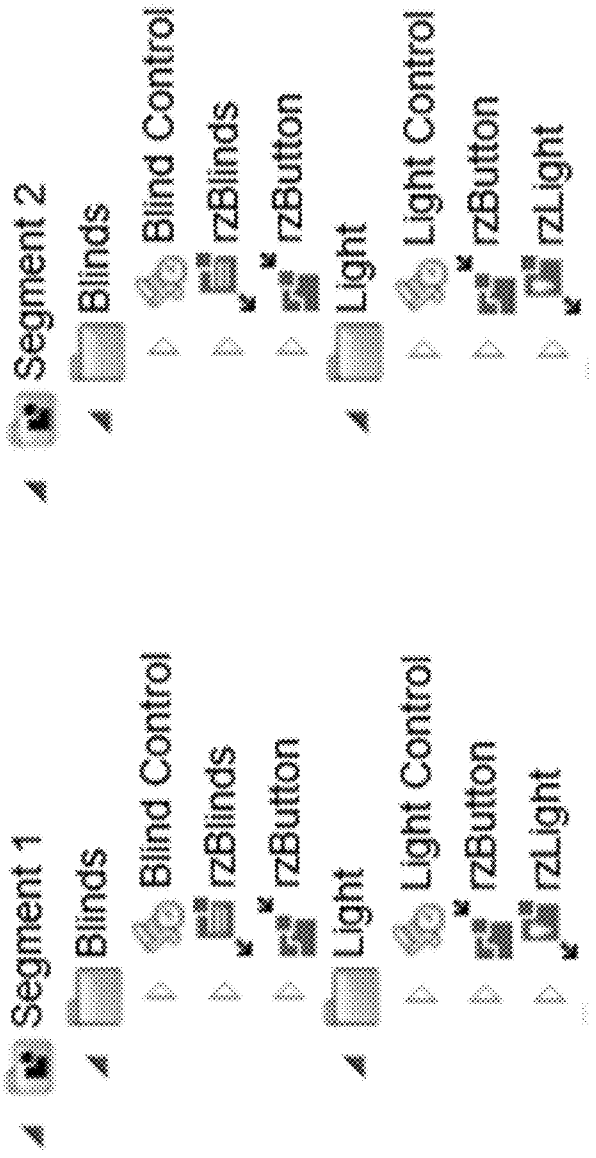

FIG. 5B is a diagram illustrating zoning of two segments in accordance with some embodiments of the disclosed system.

Segment folders can define an application that can be zoned and rezoned. The application in a segment folder represents a segment object. Referring to FIG. 5B, two segments Segment 1 and Segment 2 are depicted. Each segment folder is created in the application folder structure of a controller (e.g., RPC). The segment folder does not need to contain all of the objects of the application. For example, some of the objects may not be included as they reside outside the application folder structure. However, Segment Points of the application may have to be included. In order to make it possible for the Zoning Manager to handle the bindings between the segments during the zoning/rezoning process, the structure of the segment points within the segment folders must be identical. For example, two segment points may be considered identical if they are of the same type, have the same path and name.

A user can determine which segment is a master. However, for a segment to be a master segment, it must have a control program that allows an application to take over and control the equipment of another segment. In some embodiments, the master capable property of a segment can be set to True to designate the segment as the master. A master segment has all the necessary control programs, segment settings, segment inputs, and segment outputs that are bound to physical points to control the equipment. In the example illustrated in FIG. 5B, if Segment 1 is designated as the master by a user, Segment 2 can be considered a slave segment or a member segment. A member segment may be identical to the master (as is the case in this example), but it is possible to just include the bound segment outputs in a member.

Figure 5C:
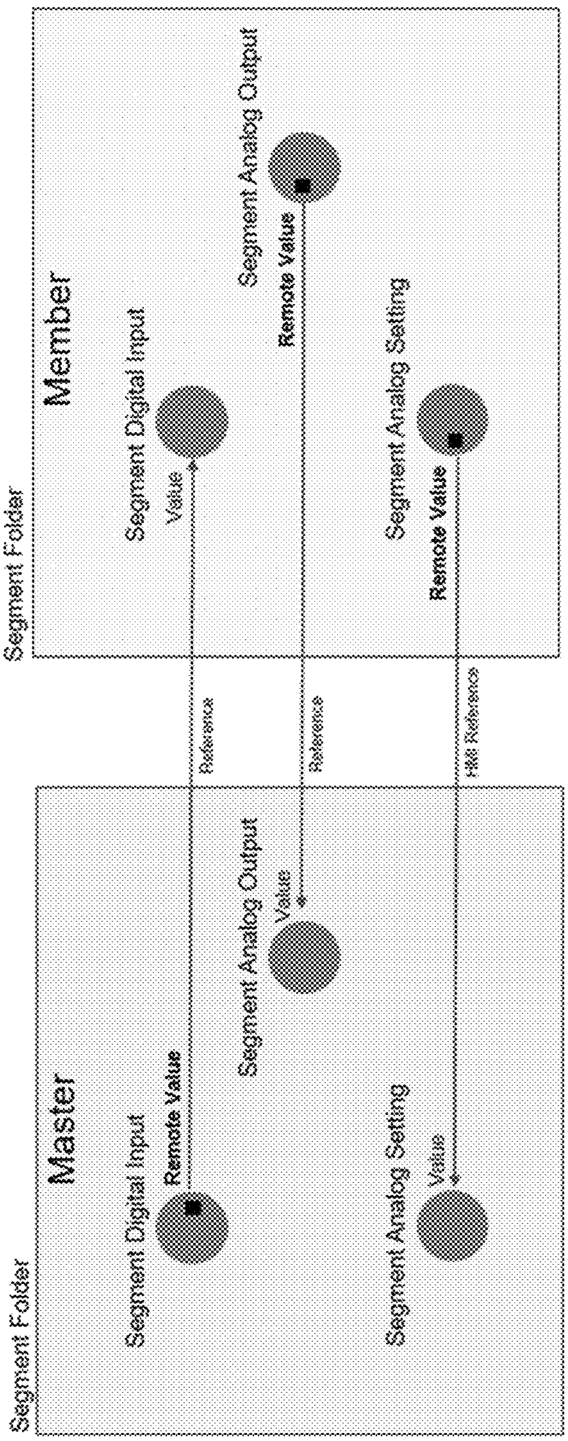

When the two segments are grouped together in a zone (e.g., using zoning application user interfaces), it causes the segments to be synchronized. A zoning manager matches the segment points in the segment folders and binds the Remote Value properties to synchronize the applications as shown in FIG. 5C. In the zone, one of the segments is the master and the other segments are members or slaves. Ungrouped segments (i.e., not part of any zone) are standalone segments and the applications contained therein work independently of each other.

Figure 6A:
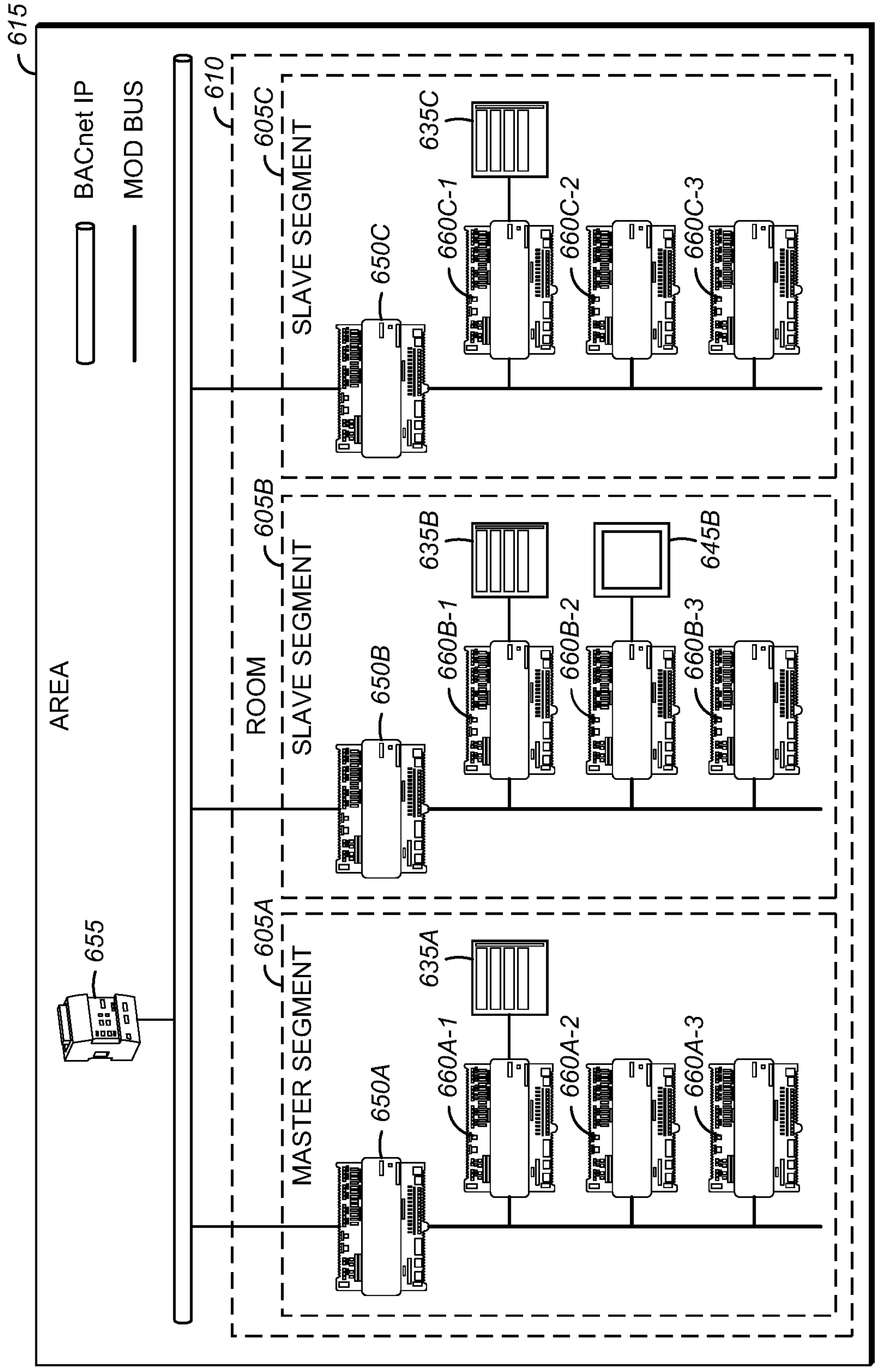
FIG. 6A is a diagram illustrating an example of a distributed control of blinds in response to rezoning of a room in accordance with some embodiments of the disclosed system.

FIG. 6A is a diagram illustrating an example of a distributed and synchronized control of blinds in response to rezoning of a room in accordance with some embodiments of the disclosed system.

Rezoning, where one or more segments work together to form a room or zone, implies distributed and synchronized control. As shown in FIG. 6A, an automation server 655 is in communication with room controllers 650A, 650B, 650C. In some embodiments, the communication between the automation server 655 and the room controllers 650A-C is over BACnet IP. In other embodiments, data exchange (e.g., communication of configurations) between the server 655 and the rom controllers may be over IP network backbone. Other network protocols such as Modbus or LonWorks may be utilized in other embodiments. The room controller 650A hosts the master segment 605A, the room controller 650B hosts the slave segment 605B and the room controller 650C hosts the slave segment 605C. When the three segments are grouped together in a single room or zone 610, a distributed and synchronized control is established over all three segments. In other words, the master segment 605A can control the slave segments 605B and 605C, and inputs detected in the slave segments can trigger the master segment 605A to respond.

As shown in the figure, in some embodiments, each segment may involve multiple controller modules. For example, the master segment 605A includes the room controller 650A which in turn is connected to controller modules 660A-1, 660A-2 and 660A-3. The room controller may exchange data with the controller modules a suitable data communication protocol such as MODBUS, EtherNet/IP, ProfiNet IO, or the like. The slave segment 605B includes a room controller 650B which is connected to three controller modules 660B-1, 660B-2 and 660B-3 over MODBUS. Similarly, the slave segment 605C includes a room controller 650C that is in communication with controller modules 660C-1, 660C-2 and 660C-3 over MODBUS. In some embodiments, these controller modules include controllers adapted for controlling specific types of environmental control equipment. For example, controller module 660A-1 is a blind controller module for controlling blinds (e.g., opening or closing blinds, changing the opaqueness of blinds, etc.). Other examples of controller modules include but are not limited to a light controller module for controlling lights (e.g., turning on or off, varying intensity) and an HVAC controller module for controlling heating and/or cooling. The controller modules may utilize field-level network (e.g., CANOpen, DeviceNet, Fieldbus, LonWorks, or the like) or direct connection to ports (e.g., RS-485) to exchange data with the environmental control equipment.

Operationally, when a user pushes a button 645B in the slave segment 605B, the input from the button push reaches the master segment 605A via MODBUS and BACnet IP. Although the blinds 635A, 635B, 635C are distributed in three different segments and controlled by respective room controllers and controller modules, the output from the master segment 605A drives the opening or closing of all the blinds 635A, 635B, 635C in all the segments. This type of distributed and synchronized control over the zoned segments ensures that all blinds 635A-C across the three segments react timely, align and avoid unnecessary movement (atomicity) and operate in a synchronized fashion.

Figure 6B:
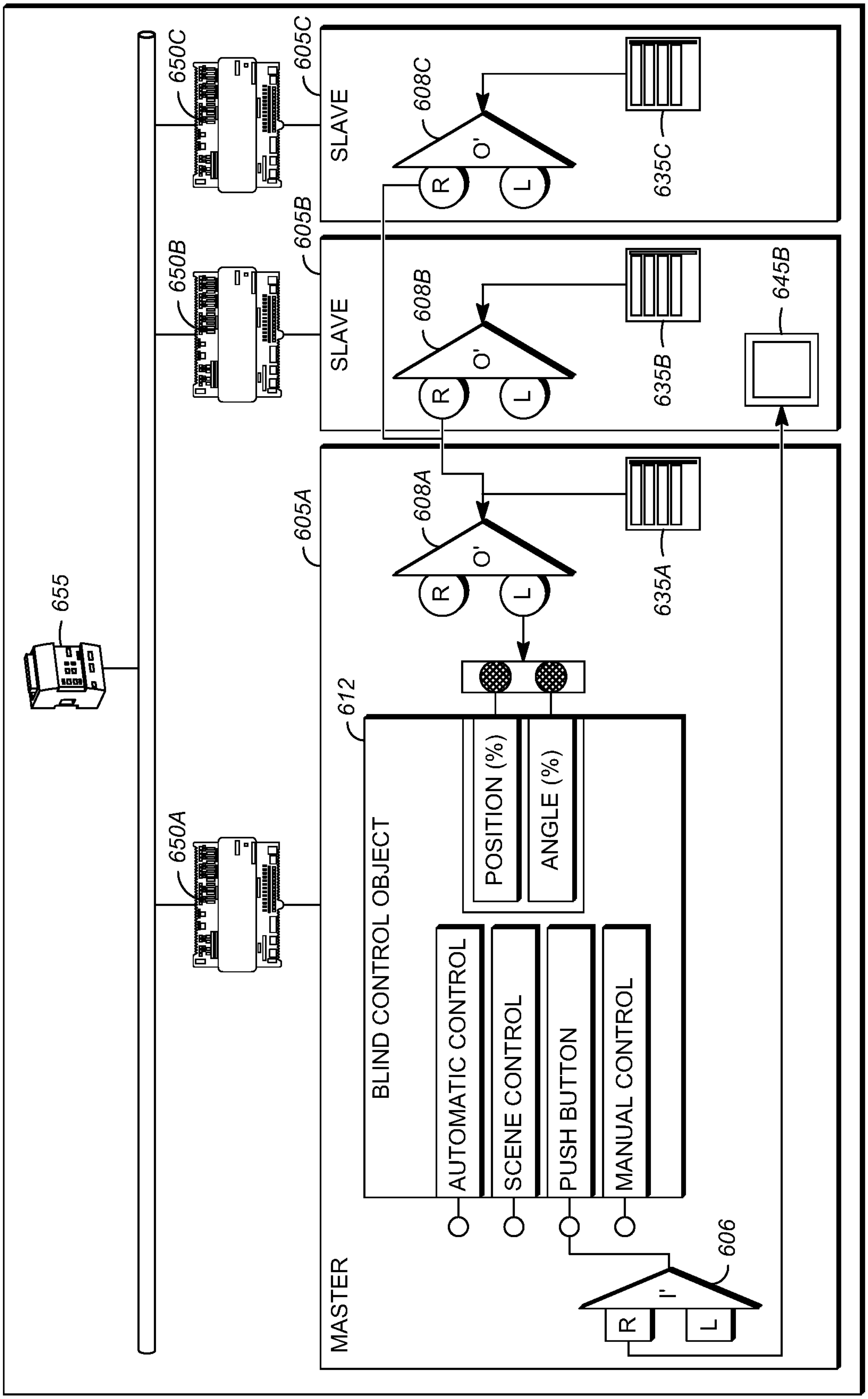
FIG. 6B is a diagram illustrating an example implementation of the distributed control of blinds in response to rezoning of three segments described in FIG. 6A in accordance with some embodiments of the disclosed system.

FIG. 6B is a diagram illustrating an example implementation of the distributed control of blinds in response to rezoning of three segments described in FIG. 6A in accordance with some embodiments of the disclosed system.

As described in reference to FIG. 6A, the three segments 605A-C are grouped together and the master segment 605A, which carries the control application 612 (i.e., blind control object) controls the opening/closing of the blinds in the master segment 605A and the slave segments 605B, 605C. The distributed control is implemented by having the master segment input object 606 combine the inputs from the master and slave segments. In this example, input from the push button 645B in the slave segment 605B is connected to the remote reference of the master segment input object 606, thereby providing a single push button input to the blind control object 612. The blind control object 612 includes the control program or application to control the operation of the blind (e.g., opening/closing, changing opacity). In some implementations, the blind control object 612 may have other operational modes (e.g., automatic control, scene control, manual control) which may require other inputs. Outputs of the blind control object 612, which may include angle and position, are provided to the local reference (L) of the master segment output object 608A which then controls the operation of the blind 635A in the master segment. As part of implementing distributed control, output from the master segment output object 608A is also connected to the remote reference (R) of the slave segment output objects 608B and 608C. In this manner, the input from the slave segment is provided to the blind control object in the master segment to generate an output that is then distributed to all blinds, thereby enabling the slave segments to follow the master segment. As a result, when a user presses the push button 645B, it causes all three blinds 635A-C to change its position and angle by the same amount as determined by the output of the blind control object 612. Thus, the three segments that were zoned together to form a room work together to control the opening/closing of the blinds.

Figure 6C:
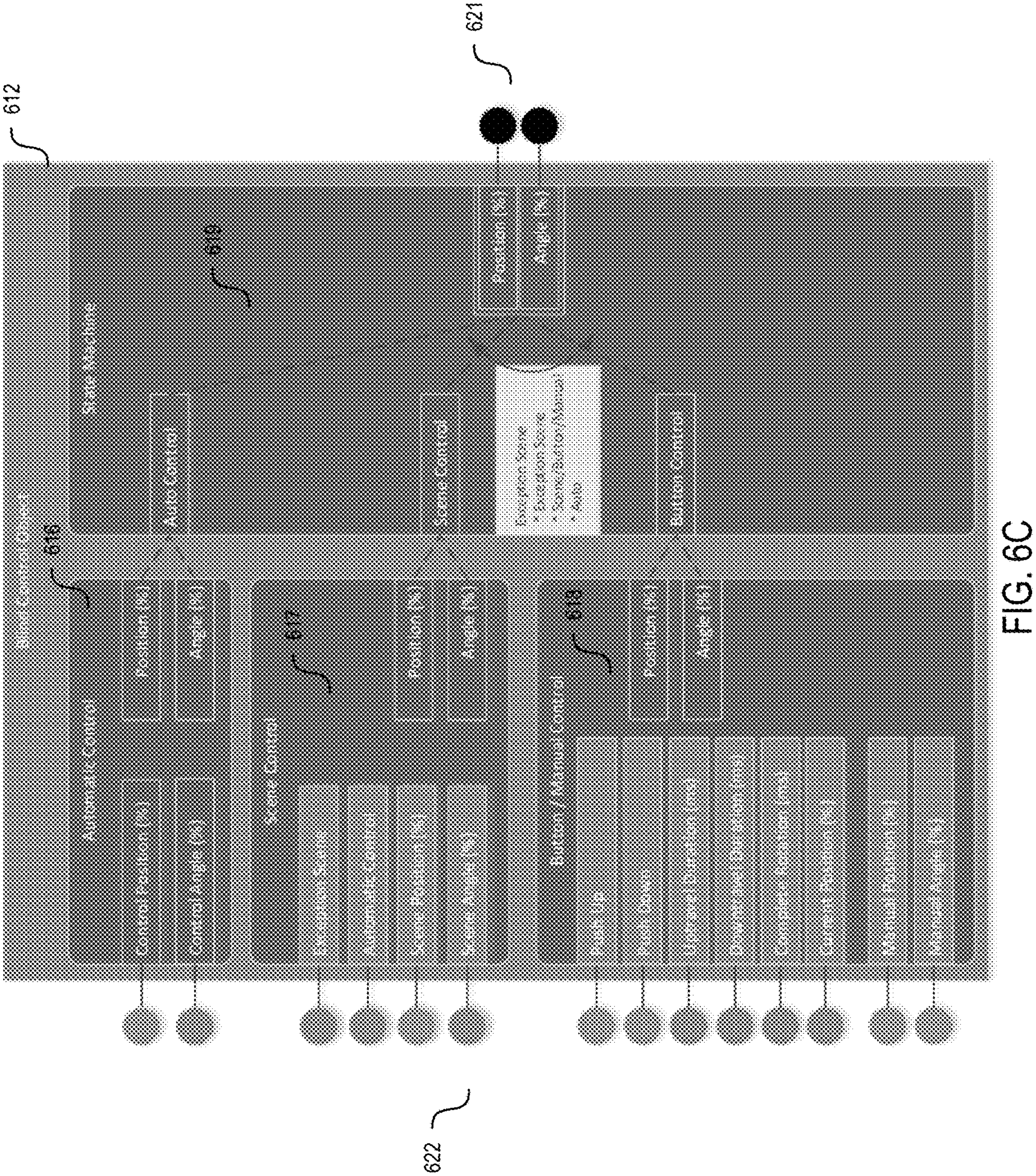
FIG. 6C is a diagram illustrating details of an example blind control object depicted in FIG. 6B.

FIG. 6C is a diagram illustrating details of an example of a blind control object depicted in FIG. 6B. The blind control object 612, in some embodiments, includes one or more control algorithms. For example, it can include an automatic control algorithm 616 that accepts inputs 622 (e.g., control position and angle) and generates as outputs position and angle. In some implementations, automatic control can include automatically opening or closing blinds based on a time schedule. By way of example, the time schedule may be derived from or related to sun tracking. In some implementations, automatic control can include control of blinds based on HVAC integration.

The blind control object 612 may include a scene control algorithm. This algorithm can accept various inputs such as exception scene, automatic control, scene position and/or scene angle and generate as output position and angle.

The blind control object 612 may include a button/manual control algorithm that enables blind control by absolute position and angle in some implementations. This control option can accept various inputs 622. One type of input can be push buttons can provide an absolute position and angle input. Another type of input can be two spring loaded push buttons, one for step up and one for step down. Yet another type of input can be a switch with a short press (push and release to control movement of blind by a fixed amount up or down) and/or long press (hold and release to control movement of a blind by a desired amount up or down) modes. Depending on which inputs 622 are detected, a state machine 619 enters into one of an auto control state, scene control state or button control state. Position and angle outputs corresponding to the activated state is selected as output 621 of the blind control object 612. In some implementations, button/manual control state may not hand over to auto control state, but a scene control state may.

Figure 6D:
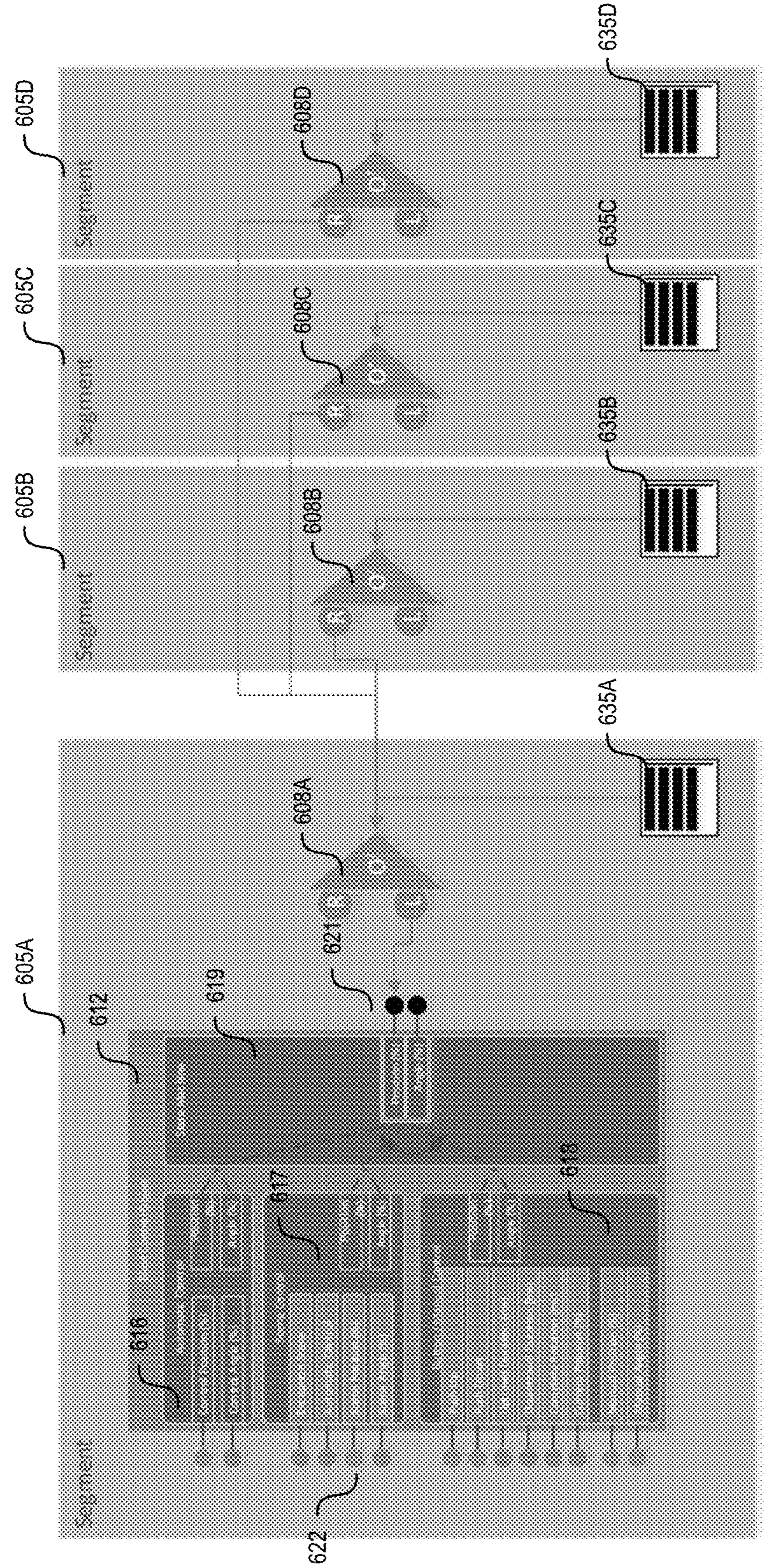
FIG. 6D is a diagram illustrating an example of a distributed blind control in accordance with some embodiments of the disclosed system.

FIG. 6D is a diagram illustrating an example of a distributed blind control in accordance with some embodiments of the disclosed system.

As shown, segments 605A-605D are grouped together to form a room. In this instance, segment 605A is designated the master segment as it includes blind control object 612, while none of the other segments have a control object. The output 621 from the blind control object is connected to the local reference (L) of the segment output object 608A, and the output of master segment output object controls the blinds in the master 605A and slave 605B-605D segments. There are several ways in which this distributed control can be implemented on hardware. For example, all segments may be hosted in a single room controller.

Figure 7A:
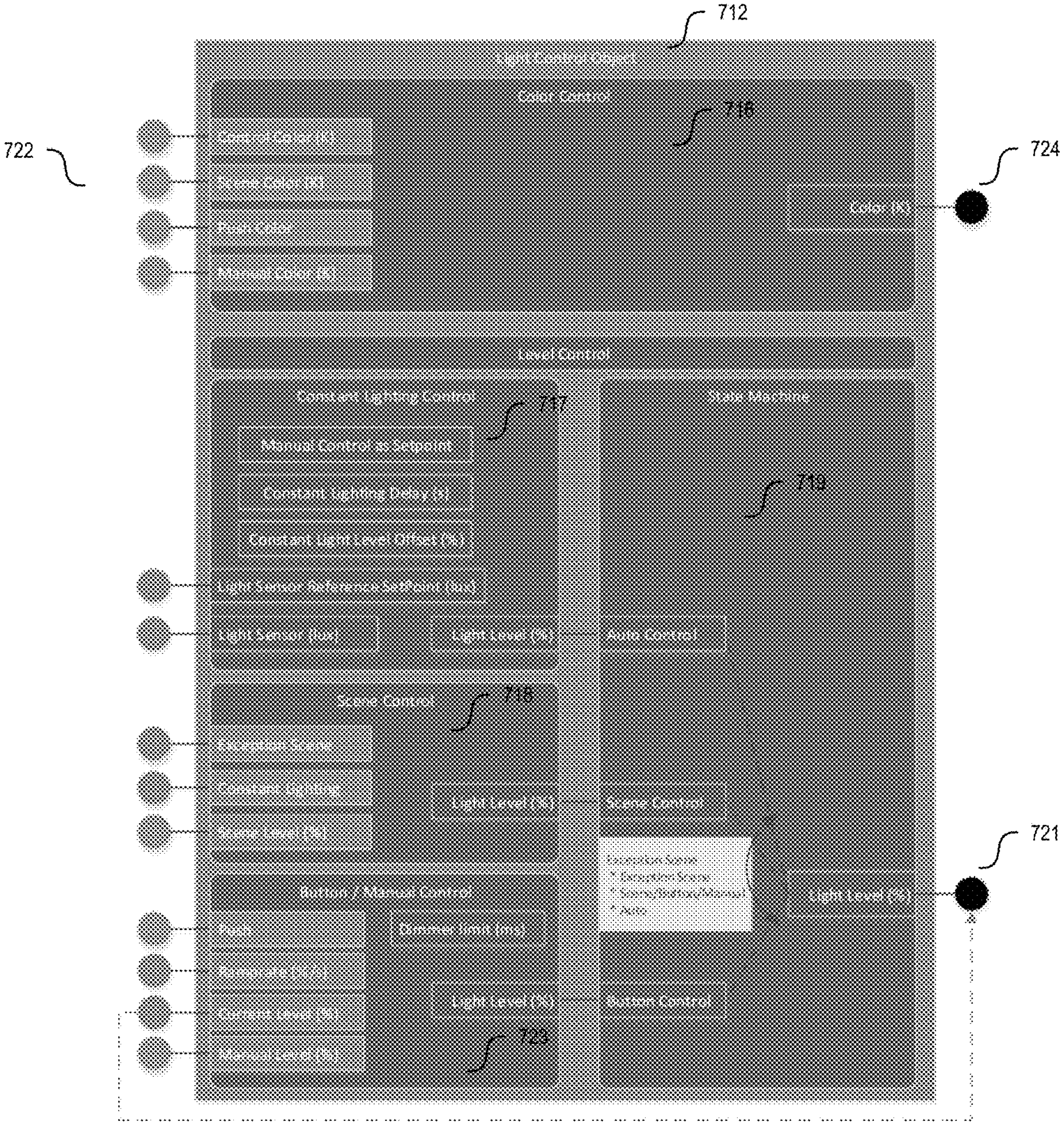
FIG. 7A is a diagram illustrating an example of a light control object in accordance with some embodiments of the disclosed system.

FIG. 7A is a diagram illustrating an example of a light control object in accordance with some embodiments of the disclosed system. Similar to the blind control object 612 described in reference to FIGS. 6B, 6C and 6D, the light control object 712 includes one or more control algorithms to control color and/or level of lighting equipment (e.g., by outputting color and/or light level). Some examples of control algorithms include a color control algorithm 716, constant lighting control algorithm, scene control algorithm 718 and button/manual control algorithm 723. The color control algorithm 716 accepts as input 722 control color, scene color, push color and manual color and outputs color 724. Color can be input using spring loaded push button, for example. The constant lighting control algorithm 717 can accept as inputs 722 light sensor reference setpoint (lux) and light sensor (lux) and output light level (%). The scene control algorithm 718 accepts as input exception scene, constant lighting and scene level and outputs light level. Manual and automatic scene controls are possible. For example, automatic circadian color control can be implemented via time schedules. Push button can be used for absolute level and color. In some implementations, level can be set by using spring loaded push button which can toggle direction (up or down) every time. For example, a short press may mean 100% (up) or 0% (down) and a long press can mean dim up or down. The button/manual control algorithm 723 takes in as input push button press, ramp rate, current level and manual level and outputs light level. Manual level can be set manually through room units while current level may be based on the light level output 721 of the light control object. Depending on the inputs detected and/or received, a state machine transitions into an auto control state, a scene control state or a button control state and outputs a light level 721 corresponding to the activated state.

Figure 7B:
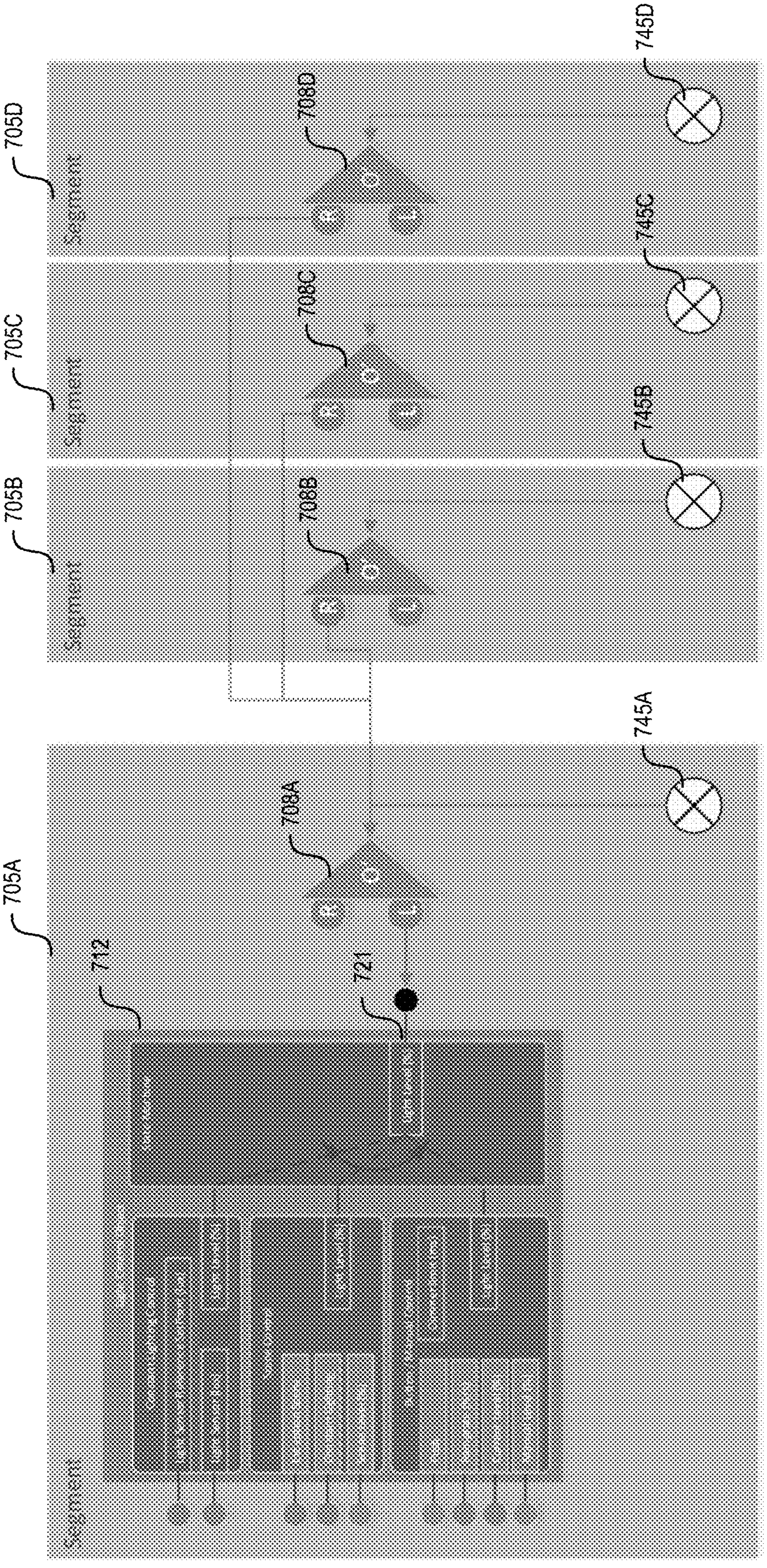
FIG. 7B is a diagram illustrating an example of a distributed light control in accordance with some embodiments of the disclosed system.

FIG. 7B is a diagram illustrating an example of a distributed light control in accordance with some embodiments of the disclosed system.

As shown, the light level output 721 from the master segment 705A is controlling the lights 745A-D in the master segment 705A as well as the slave segments 705B-D. The output 721 is connected to the local reference (L) of the output segment object 708A which controls the light 745A. The output segment object 708A is also connected to the remote references (R) of each of the output segment objects 708B-D which then controls the respective lights 745B-D.

There are several ways in which the distributed control can be implemented on hardware. For example, all segments may be hosted in a single room controller. In some implementations, a positive path may comprise having multiple individual lights on the same module or multiple individual lights on multiple modules. In such implementations, there may be multiple simultaneous sources of control. By way of another example, the segments may be hosted on multiple room controllers. In this case, a positive path may comprise of a number of cross room controller bindings, master serving multiple slaves, timing impact of cross RP bindings and/or multiple simultaneous sources of control.

FIGS. 8A-F illustrate example user interfaces in accordance with some embodiments of the disclosed system.

Figure 8A:
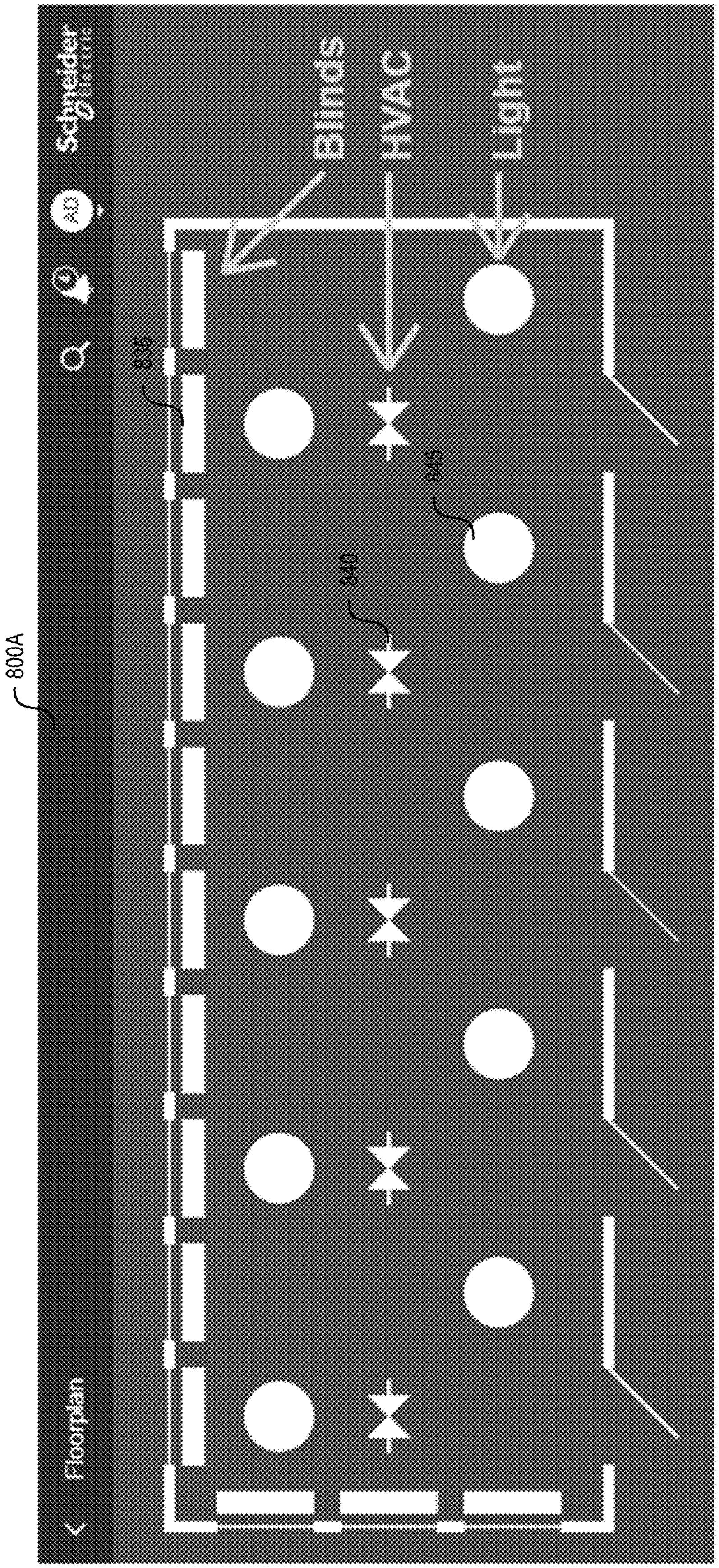
FIGS. 8A-F illustrate example user interfaces in accordance with some embodiments of the disclosed system.
Figure 8B:
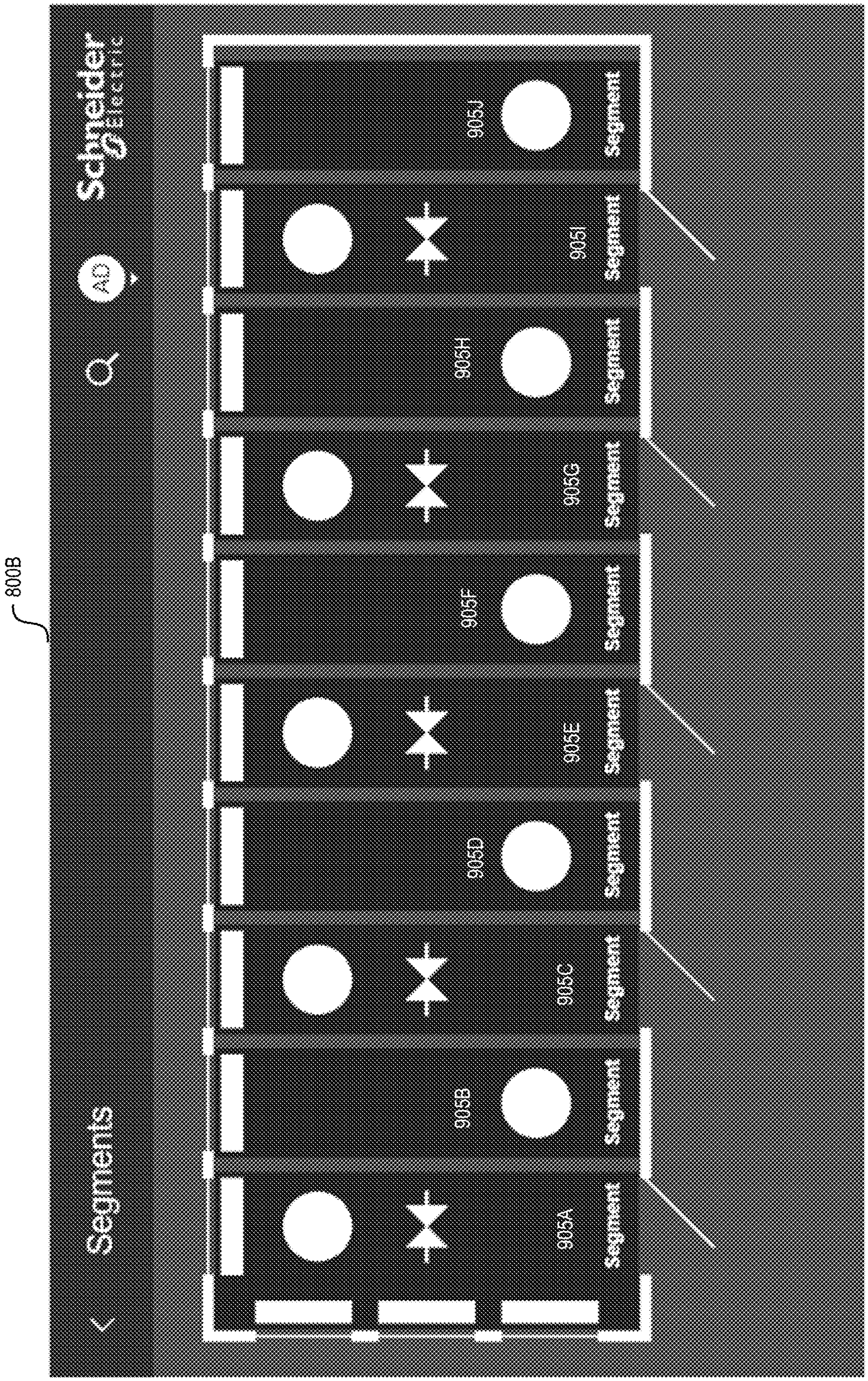
Figure 8C:
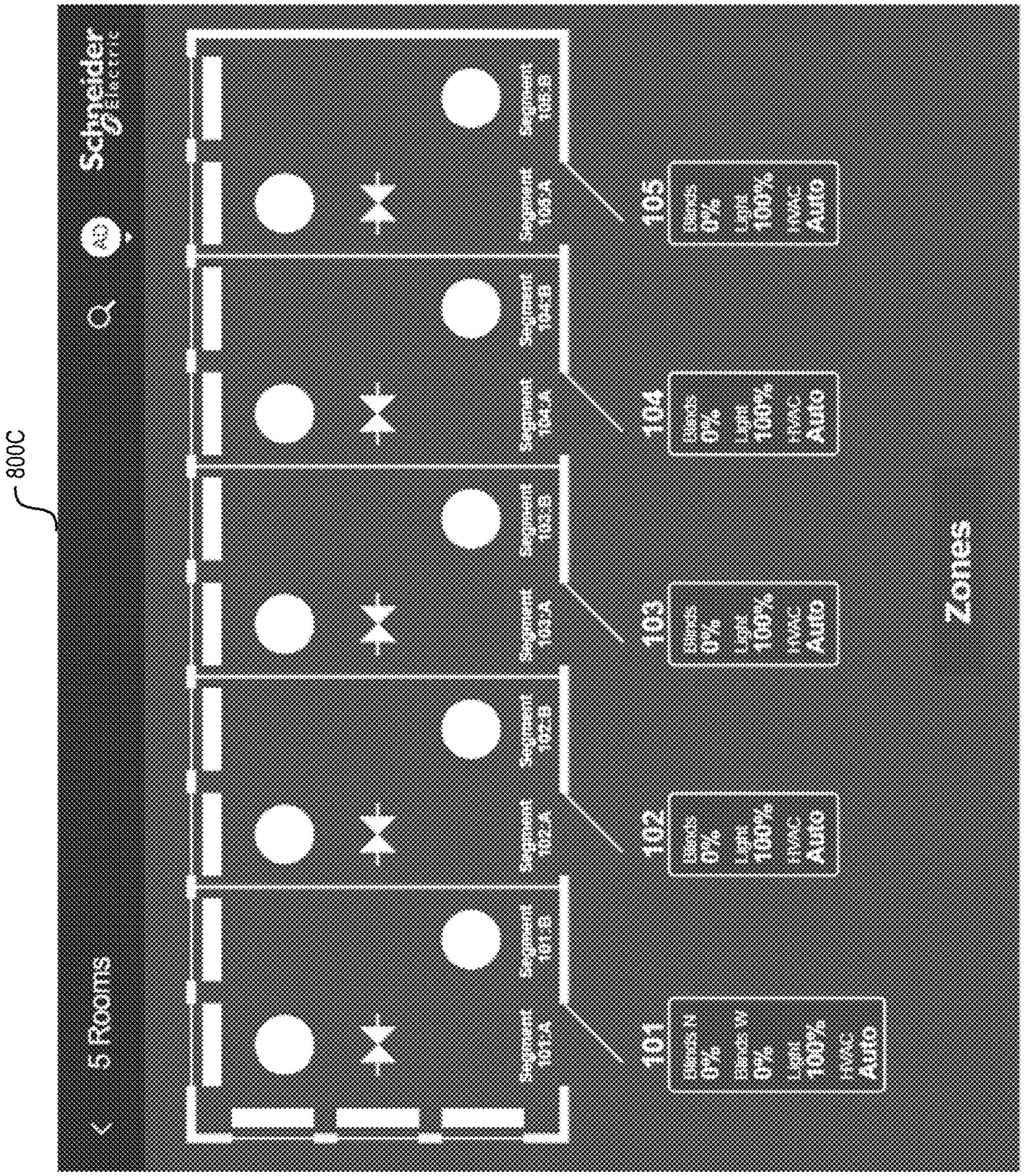

Referring to FIG. 8A, the user interface depicts a floorplan view 800A of an area having a set of blinds 835, a set of HVAC equipment 840 and a set of lights 845. Referring to FIG. 8B, the user interface depicts a segments view 800B of the area. The area is divided into ten segments 805A-J. As depicted, each segment can include one or more environmental equipment (e.g., light, blind, HVAC). FIG. 8C is a user interface depicting a room view 800C of the area. As shown, the ten segments from FIG. 8B are now shown as reconfigured into five rooms or zones. Zone 101 includes segment 101:A and segment 101:B where the north and west blinds are both open 0% (i.e., closed), the light level is set to 100% and the HVAC is set to auto control. Zone 102 includes segments 102:A and 102:B, where the blinds are closed, light level is on 100% and HVAC is set to auto control. Zone 103 includes segments 103:A and 103:B, where the blinds are closed, light level is 100% and the HVAC is set to auto control. Zone 104 includes 104:A and 104:B where the blinds are closed, light level is 100% and the HVAC is set to auto control. Finally, zone 105 includes 105:A and 105:B where the blinds are closed, light level is set to 100% level and HVAC is set to auto control.

Figure 8D:
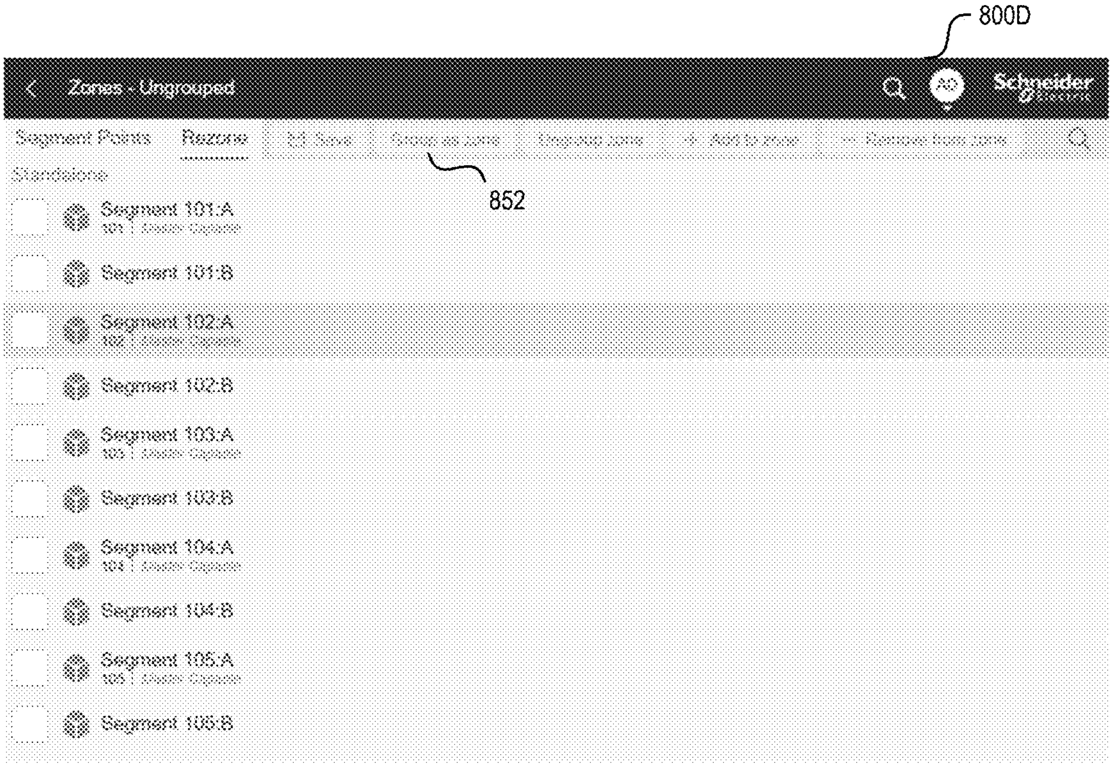
Figure 8E:
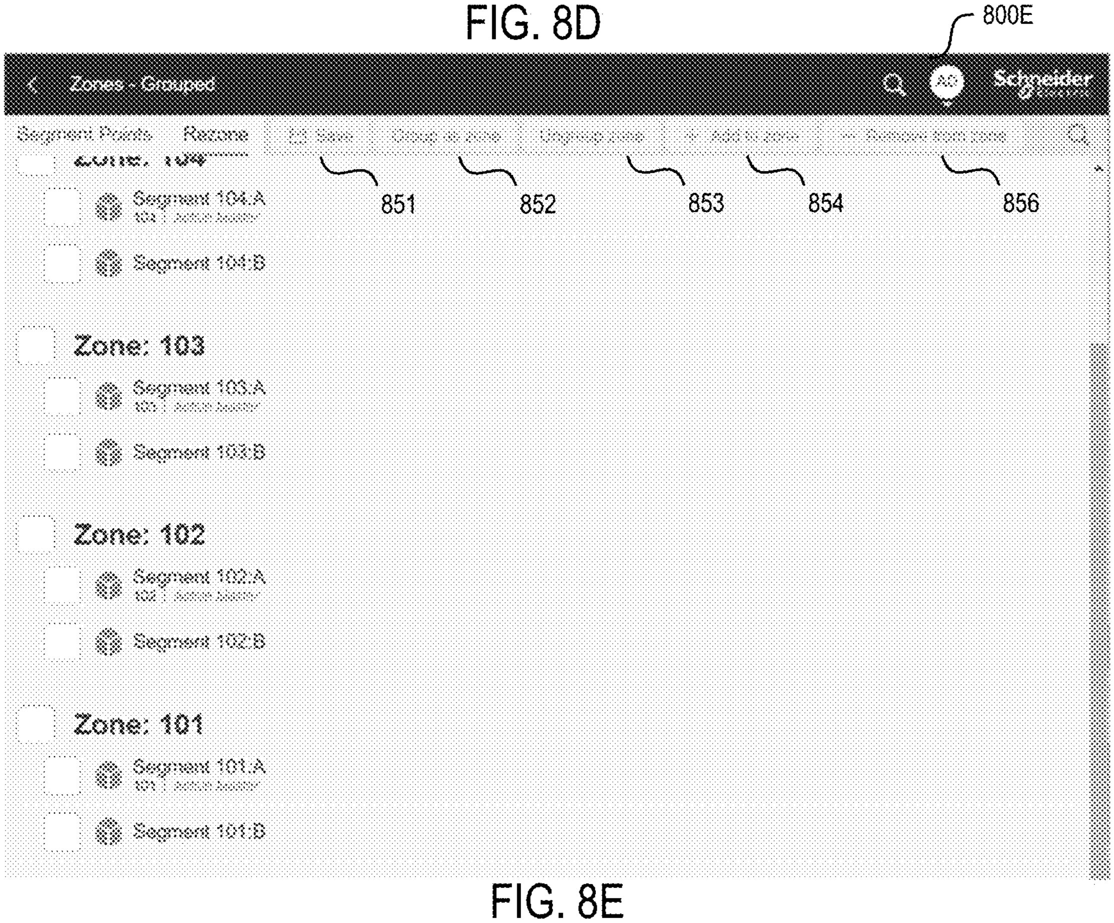

Referring to FIG. 8D, the user interface depicts a zones—ungrouped view 800D that includes a listing of ungrouped or standalone segments. In some implementations, a user can select one or more segments and select "Group as zone" to link or group those segments together to create a zone or room. The user can, for example, select segment 102:A and segment 102:B and select "Group as zone" option 852 to create "Zone:102" as shown in the zones—grouped view 800E in FIG. 8E. Referring again to FIG. 8E, the user interface depicts the various grouped segments or zones 101-105. Before two or more segments can be grouped together, a rules engine of the disclosed system checks whether the segments to be grouped together satisfy one or more rules for zoning/re-zoning. One example of such a rule is that at least one of the segments to be grouped together must be a master segment. By way of example, in FIGS. 8D and 8E, Segment 102:A is a master capable segment, and so it is possible to group Segment 102:A and Segment 102:B which is not a master capable segment to create Zone: 102. Although not shown, it is possible in some implementations to perform other modifications to zones. For example, by selecting "ungroup zone" 853 option, link between segments can be severed. One or more segments can be added to an existing zone by selecting "+Add to zone" 854 option. Similarly, to remove one or more segments from an existing zone, the option "−Remove from zone" 856 can be selected. The user can save the changes made by selecting "Save" option 851.

Figure 8F:
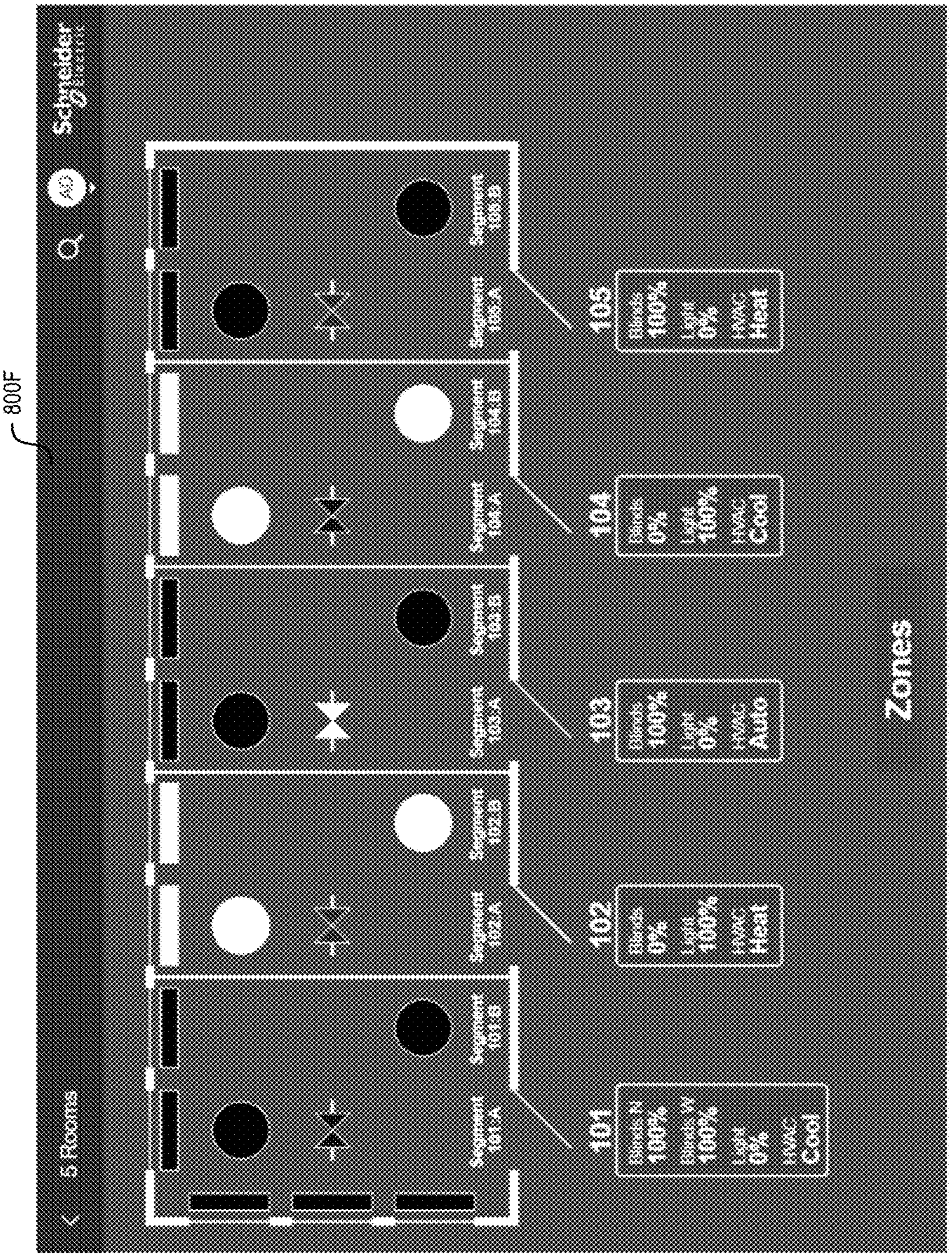

FIG. 8F is a user interface depicting a room view 800F of the area including synchronized segments following rezoning. As shown, in zone 101, the two north blinds are synchronized and are both at 100%. The west three blinds are synchronized and are all at 100%. The two lights are synchronized and are off at 0%. Finally, the HVAC is set to cool. In zone 102, both the blinds and lights are working together, and the HVAC is set to heat. Similarly, in zone 103 the lights and blinds are both synchronized, and the HVAC is set to automatic control, and so on.

Figure 9A:
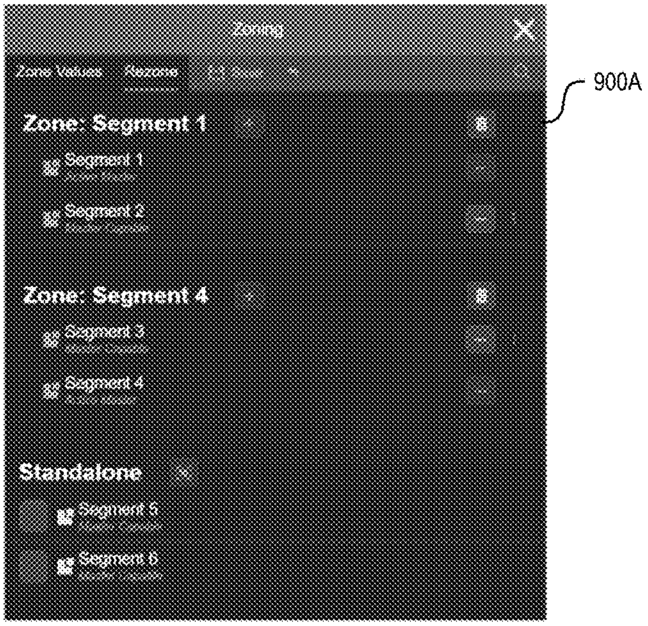
FIG. 9A is a diagram illustrating an example user interface depicting rezoning view in accordance with some embodiments of the disclosed system.
Figure 9B:
FIG. 9B is a diagram illustrating the controller and segment folder structures corresponding to the rezoning view depicted in FIG. 9A.

FIG. 9A is a diagram illustrating an example user interface depicting rezoning view in accordance with some embodiments of the disclosed system. The rezoning view 900A depicts a first zone that includes Segment 1 and Segment 2 where Segment 1 is the Active Master, a second zone that includes Segment 3 and Segment 4 where Segment 4 is the Active Master, and standalone segments that include Segment 5 and Segment 6. The controller and segment folder structures corresponding to this configuration are depicted in FIG. 9B. Folder structure 960 includes a zone folder named "Master RP-C-12A/Segment 1" which contains two segment folders "RP-C-12A/Segment 1" and "RP-C-12A/Segment 2" which are both master capable. The zone folder name indicates the controller ("RPC-12A") as well as the Active Master ("Segment 1"). The second zone folder named "Master RP-C-12B/Segment 4" contains two segment folders "RP-C-12A/Segment 1" and "RP-C-12A/Segment 2" which are both master capable and where Segment 4 is the Active Master. The view 961 depicts controllers and the segment folders that reside therein. For example, Segments 1, 2 and 3 reside in the controller "RP-C-12A" whereas Segments 4, 5 and 6 reside in the controller "RP-C-12B". Both of these controllers are hosted by the same server 955.

Figure 10:
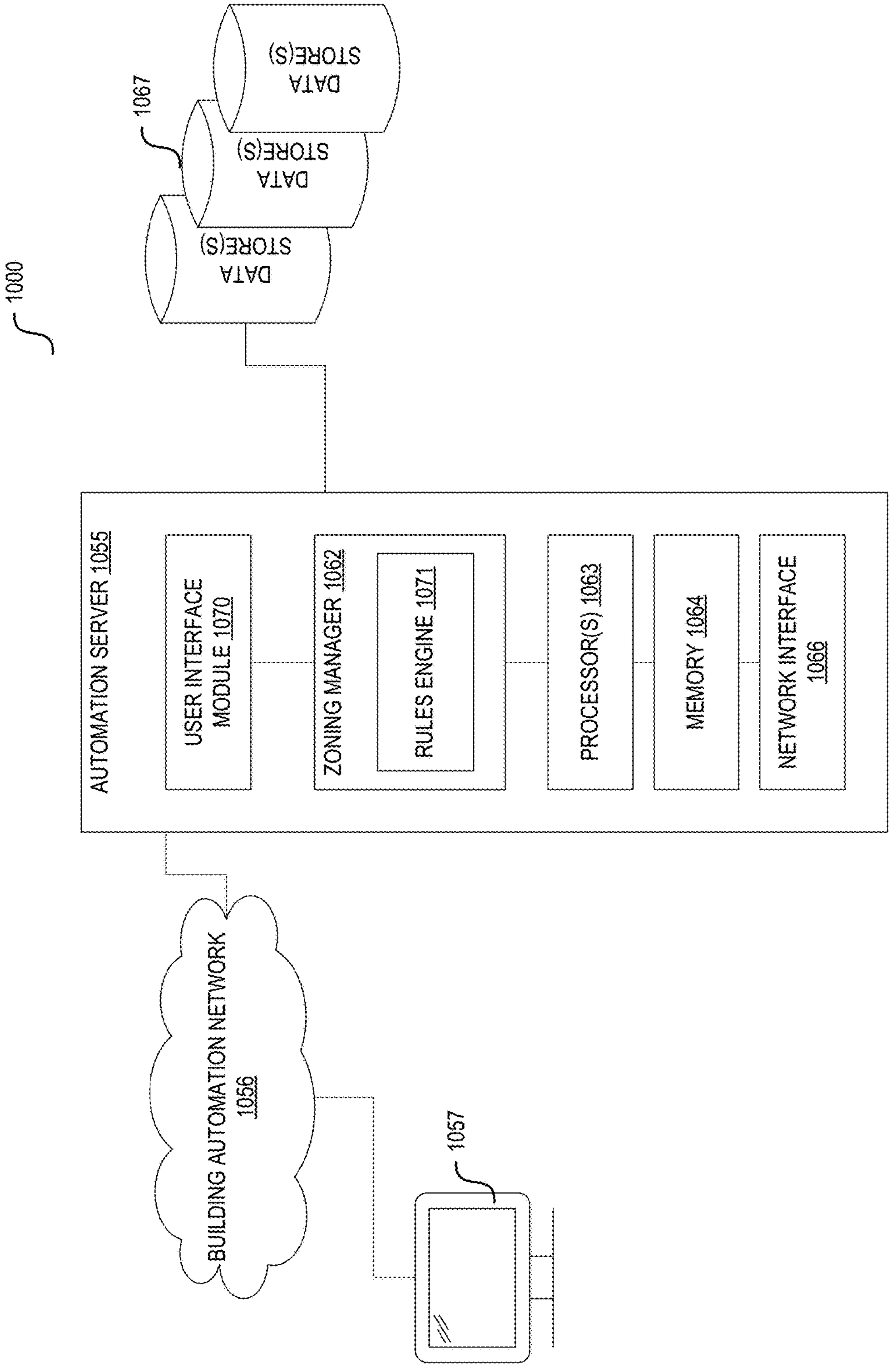
FIG. 10 is a diagram illustrating some example components of the automation server in accordance with some embodiments of the disclosed system.

FIG. 10 is a diagram illustrating the disclosed system in accordance with some embodiments. The disclosed system 1000 may include a client device 1057 from which a zoning tool or a web or mobile application may be launched to perform zoning/rezoning. It should be noted that the zoning/rezoning may be performed in run time or offline. In various embodiments, the client device 1057 may be a computer system. The computer system may be a workstation, personal computer, mobile device, tablet, HMI or any other device capable of connecting to a communication network to communicate with an automation server 1055. In some embodiments, the communication network may be a building automation network 1056. The automation server 1055 may include one or more components or modules such as a user interface module 1070, a zoning manager 1062, one or more processor(s) 1063, memory 1064, network interface 1066, and/or the like. The automation server 1055 may be communicatively coupled to one or more data stores 1067. It should be noted that the automation server 1055 may include many other components or modules not described or shown. One or more modules may be combined or subdivided in various embodiments.

The user interface module 1070 may generate user interfaces such as those illustrated in FIGS. 8A-F that a user can interact with. The user interface module 1070 can receive inputs (e.g., segments to be zoned/rezoned) and provide the inputs to the zoning manager 1062 in some embodiments. The zoning manager 1062 may include a rules engine 1071 that uses a set of rules to determine whether the inputs from the user are valid or compatible. For example, the rules engine can check if the selected segments to be grouped have a path/name match and type match. If there is no match, then the segments may not be combined. Similarly, another rule that can be checked is whether a master is selected for a zone. If no master is selected, in some implementations, the first found master capable segment may be selected as the master. In other implementations, the master capable segment that is the union or summary of all the segments may be selected as the master. Yet another example of a rule includes checking to ensure segments that are being combined control the same type of environmental control equipment. For example, a blind segment that controls a blind may not be combined with a light segment that controls lights. Similarly, output of a blind segment may not be connected to an HVAC equipment. Various other rules are possible to ensure rezoning results in fully functional zones. In some embodiments, the zoning manager 1062 may use a zoning policy to determine if a user has permission to perform zoning actions.

The automation server 1055 may be communicatively coupled to one or more data stores 967. The data store(s) may store rules, zoning policies, zoning configurations or presets, and the like.

Figure 11:
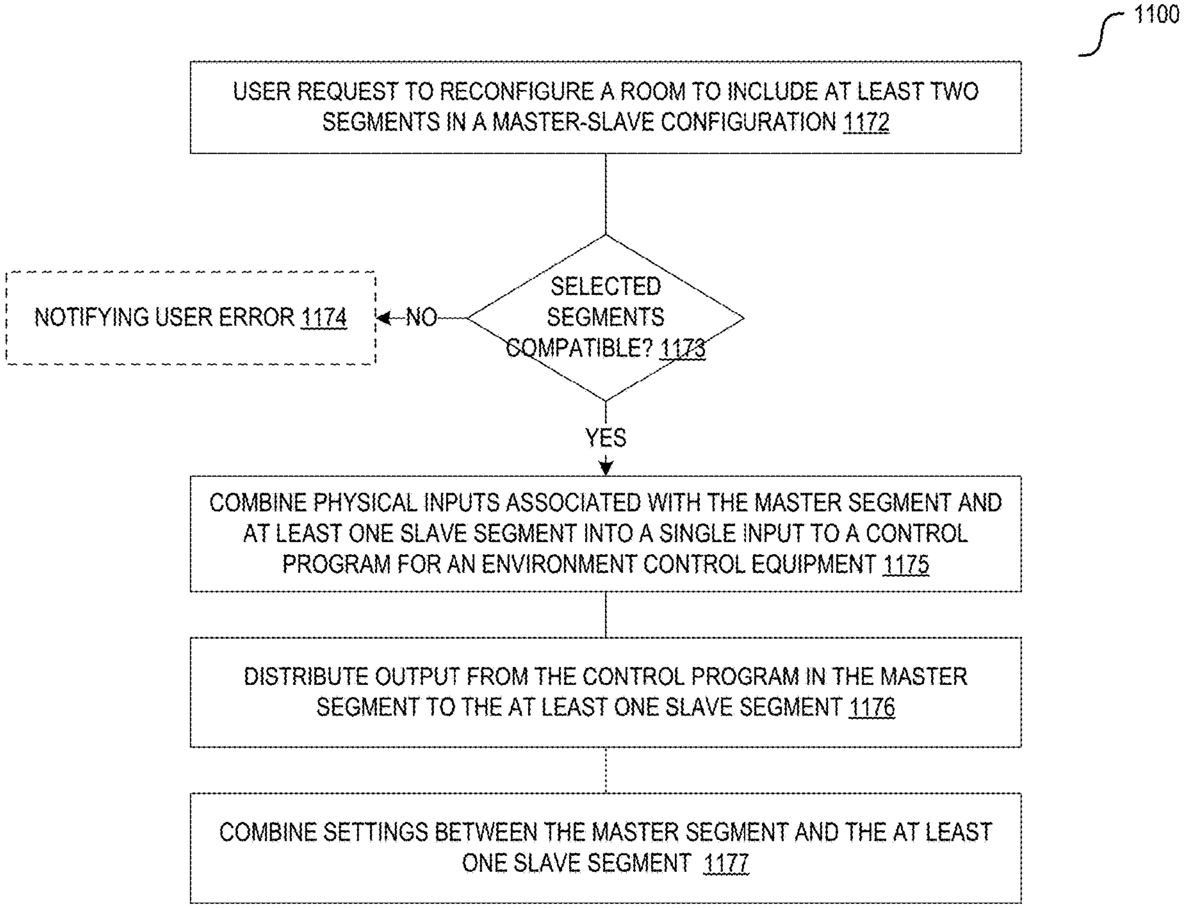
FIG. 11 is a diagram illustrating an example method of creating or rearranging environmental control zones.

The automation server 1055, in some embodiments, may implement the method described in FIG. 11. The method 1100 includes receiving a user request to reconfigure a room or perform rezoning at block 1172. The user request may include at least two segments in a master-slave configuration. The received information may be parsed by the user interface module 1070 and provided to the zoning manager 1062. In some implementations, the rules engine 1071 may be a part of the zoning manager 1062. The rules engine 1071 may check if the selected components are compatible (e.g., if rezoning is possible) based on a set of rules as described above at block 1173. These set of rules may be stored in the data store(s) 1067. If the segments cannot be grouped together, then in some embodiments, the user may be notified of the error at block 1174. Alternatively, no user notification may be provided in other embodiments. The zoning manager 1062 may combine and distribute inputs associated with the master segment and at least one slave segment into a single input to a control program for controlling an environmental control equipment such as an HVAC, blind, light, etc., at block 1175. In some instances, it may be the case that only one of the master or slave segment has an input. In such a situation, as there is only one physical input, there would be no need to perform the combining of physical inputs step. The zoning manager 1062 may distribute output from the control program in the master segment to the at least one slave segment to synchronize their operation at block 1176. The zoning manager 1062 may also combine settings between the master segment and the at least one slave segment at block 1177 to enable these settings to be shared between the segments when operational By performing these steps, the zoning manager 1062 creates a zone in which the master and slave segments operate in a synchronized manner to control environmental control equipment, without requiring any manual re-engineering, rewiring or reprograming.

Figure 12A:
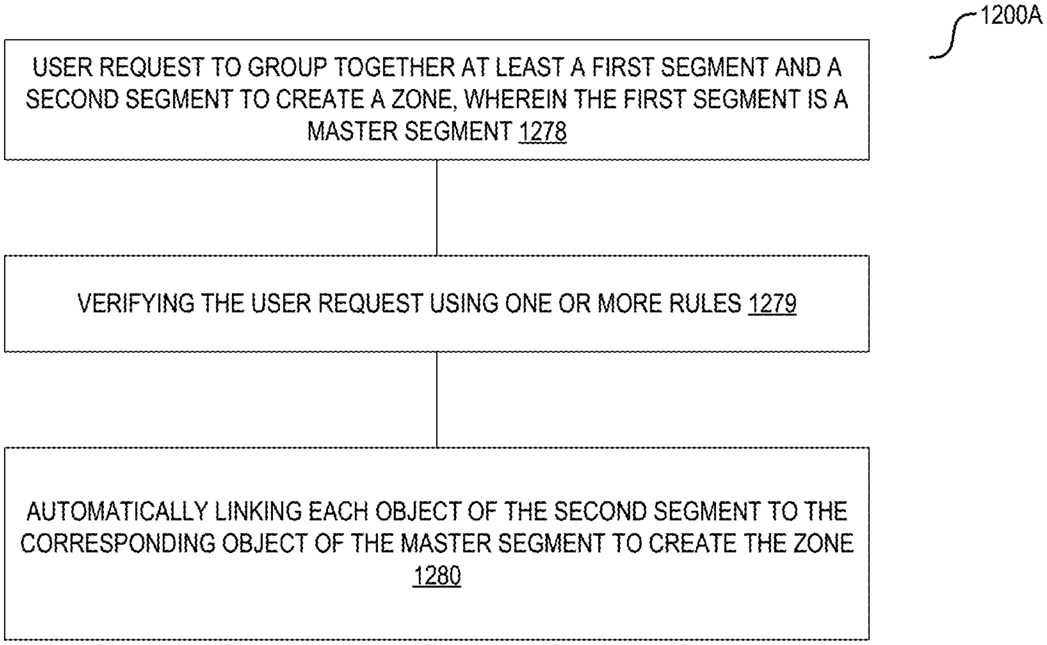
FIG. 12A is a diagram illustrating an example method of zoning/re-zoning in accordance with some embodiments of the disclosed system.

FIG. 12A is a diagram illustrating an example method of zoning/re-zoning in accordance with some embodiments of the disclosed system.

The method 1200A includes receiving a user request to group together at least a first segment and a second segment to create a zone at block 1278. The user request may be made using a zoning tool accessed from a client device 1057. The user request may be received by the automation server 1055 (e.g., via the user interface module 1070). At block 1279, the zoning manager 1062 (including the rules engine 1071) may verify the user request using one or more rules. The one or more rules include a rule that each object of the master segment be of the same type and have the same path as the corresponding object in the second segment. The one or more rules further includes a rule that at least one of the first segment or the second segment have a master capable property enabled (i.e., set to true). At block 1280, the zoning manager 1062 automatically links each object of the second segment to the corresponding object of the master segment to create the zone. Within this zone, control of environmental control equipment associated with the master segment and the second segment are synchronized.

Figure 12B:
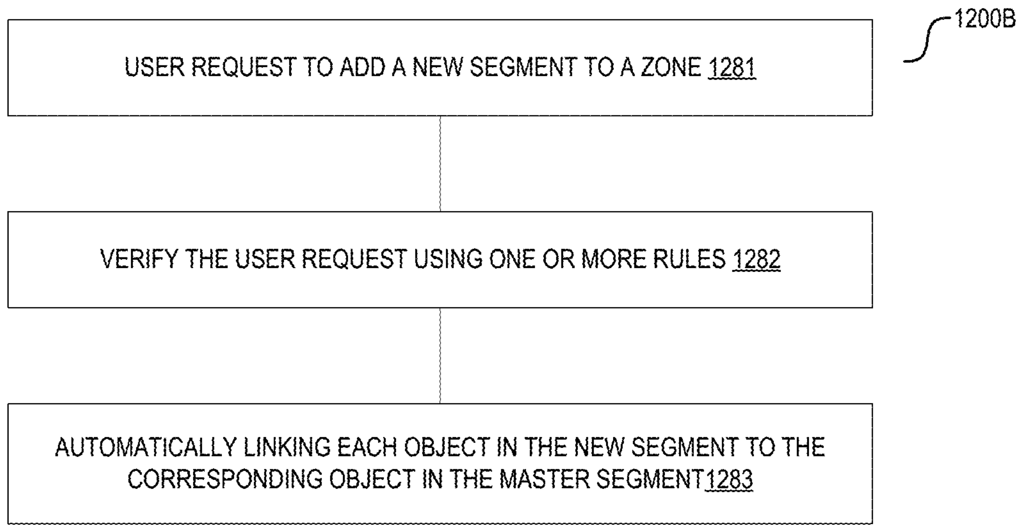
FIG. 12B is a diagram illustrating an example method of rezoning by adding a new segment to a zone in accordance with some embodiments of the disclosed system.
Figure 12C:
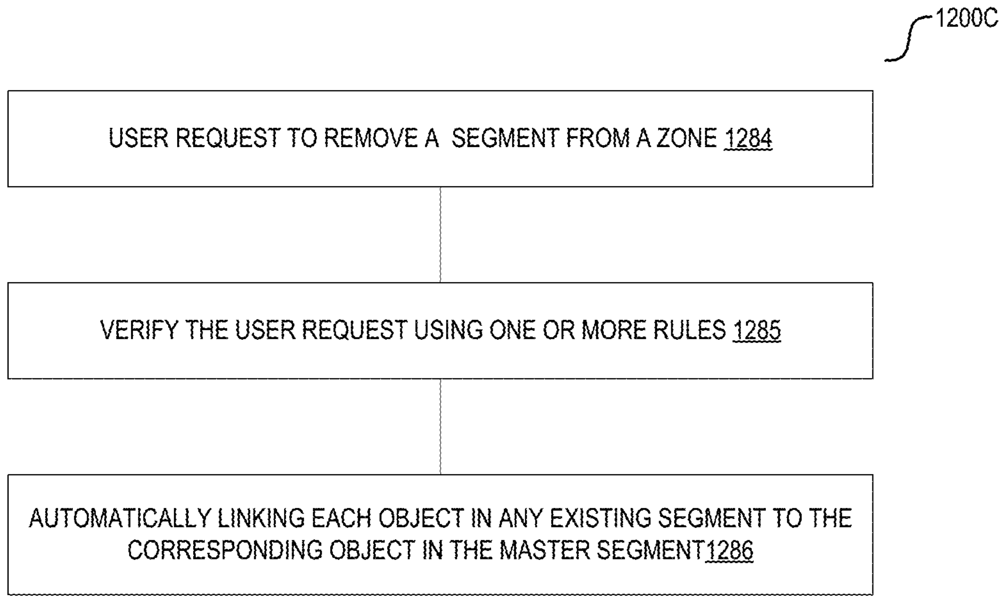
FIG. 12C is a diagram illustrating an example method of rezoning by removing a segment from a zone in accordance with some embodiments of the disclosed system.

FIGS. 12B and 12C are diagrams illustrating example methods of re-zoning via adding a new segment and removing an existing segment respectively in accordance with some embodiments of the disclosed system.

Referring to FIG. 12B, the method 1200B starts at block 1281, when a user request to add a new segment to a zone is received. In response, at block 1282, the zoning manager 1062 (e.g., via the rules engine 1071) may verify the user request using one or more rules. At block 1283, after verifying the user request, the zoning manager 1062 automatically links each object in the new segment to the corresponding object in the master segment, thereby extending synchronized control of the environmental control equipment across the existing and new segments in the zone.

Referring to FIG. 12C, the method 1200C starts at block 1284, when the automation server 1055 receives a user request to remove a segment from a zone. In response, at block 1285, the zoning manager 1062 (e.g., via the rules engine 1071) may verify the user request using one or more rules. An example of the verification may include checking if the removal of the segment results in only one member remaining which then becomes a standalone segment. In such an instance, the zoning manager 1062 may proceed with removing the segment, with or without user approval. Another example of the verification may include checking to make sure that at least one master capable segment remains in the zone after removing the segment. Various other rules, including but not limited to those described above, may be applicable. At block 1286, the zoning manager 1062 automatically links each object in any existing segment to the corresponding object in the master segment. For example, if the zone includes two master capable segments, and the segment that is removed is the current master, then the zoning manager 1062 may designate the other remaining master capable segment as the current master. The input, output and/or setting objects in the existing member segments are then linked to the newly designated master segment to create a functional zone with synchronized control.

In some embodiments of the disclosed system, a zoning preset may be defined, and configurations associated with the zoning preset may be used to perform rezoning. This is in contrast to having a user select or identify segments to be grouped together. A zoning preset, as used herein, includes a set of segments which may be combined together in one or more predefined configurations. Each such configuration of segments can then be manually or automatically activated to effectuate rezoning. By way of example, consider a floorplan that includes a movable wall. The sliding wall may be moved to create a large conference room in the morning and changed back into two individual meeting rooms (Room 1 and Room 2) in the afternoon. In this example, Room 1 includes segments A and B, and Room 2 includes segments C and D. So, segments A, B, C and D are considered part of a zoning preset, where in a first predefined configuration, segments A, B, C and D are grouped in a zone and synchronized. In a second predefined configuration, segments A and B are grouped together in one zone and segments C and D are grouped together in another zone, so that the two zones operate independently from one another. A predefined configuration may be automatically activated, for example, based on a day/time schedule, detected movement of the sliding wall, engagement/disengagement of magnetic contact, and/or the like.

Figure 12D:
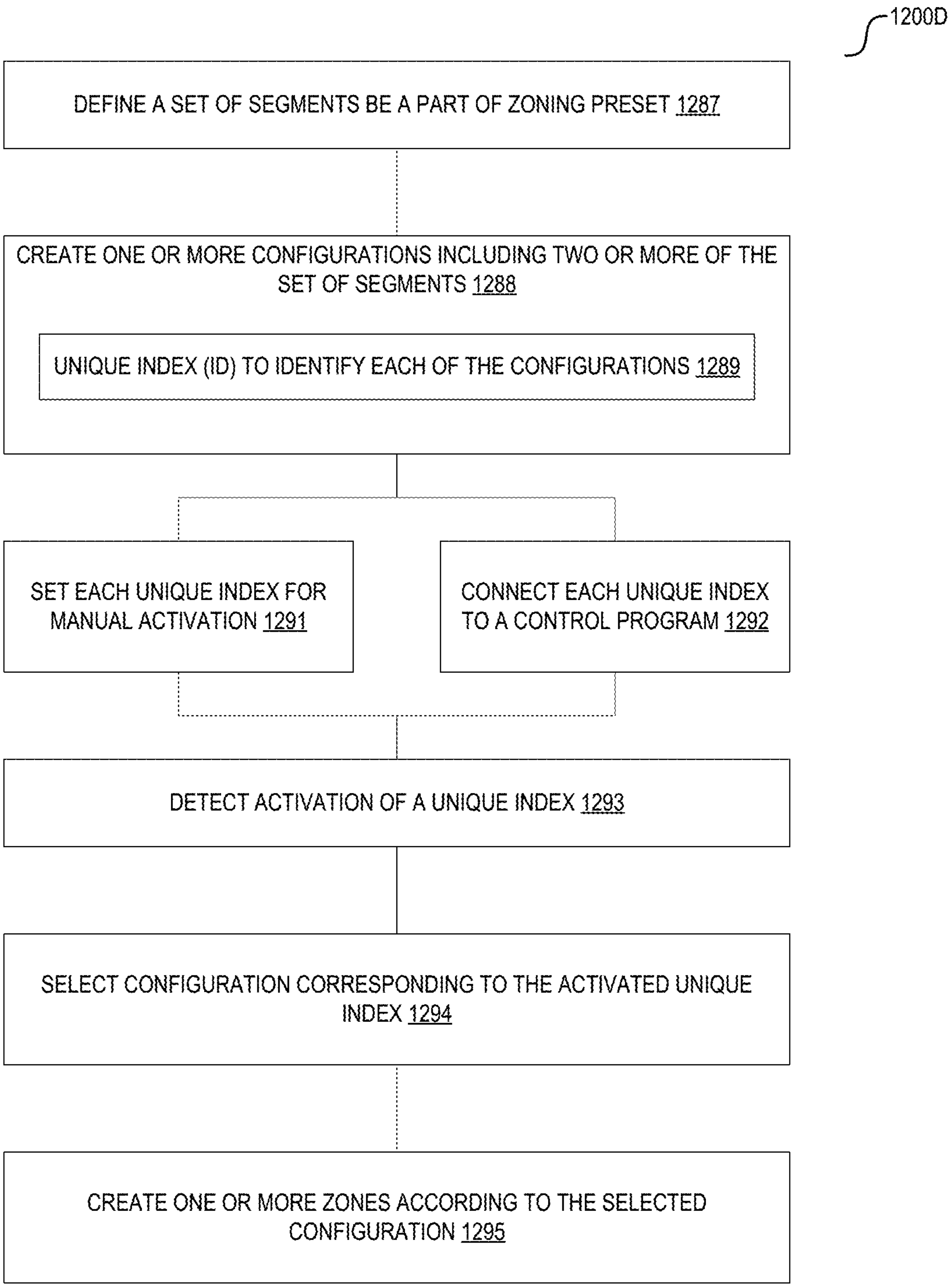
FIG. 12D is a diagram illustrating an example method of performing rezoning of a space using a zoning preset in accordance with some embodiments of the disclosed system.

FIG. 12D is a diagram illustrating an example method of performing rezoning of a space using a zoning preset in accordance with some embodiments of the disclosed system.

The method starts at block 1287 with the defining of a set of segments as a part of a zoning preset. This information may be received from a user and stored in the data stores 1067. At block 1288, one or more configurations of segments can be created. The configurations may be created based on selections made by a user. Each configuration of segments may include two or more segments from the set of segments that comprise the zoning preset. In some embodiments, creating the one or more configurations includes verifying (e.g., by the zoning manager 1062) each configuration using one or more rules such as those described above. The zoning manager 1062 may, for each configuration, automatically link each object in the member segment(s) to the corresponding object in the master segment to create one or more zones.

At block 1289, the zoning manager 1062 assigns a unique index or identifier to each configuration. In some implementations, the zoning manager 1062 may connect each unique index to a control program at block 1292 to enable automatic activation of the configuration corresponding to the unique index. In other implementations, it is possible to configure each unique index to manual activation. Manual activation may be the default option if the unique index is not connected to a control program. In yet other implementations, some unique indices may be connected to a control program, while others may be manually activated. These configurations may be stored in the data store(s) 1067 and/or downloaded to one or more room controllers. In operation, activation of a unique index may be detected at block 1293 (e.g., by sliding open of a moveable wall that may be detected by a sensor or activation of a motor). In response, the disclosed system may select a configuration corresponding to the activated unique index at block 1294 and execute the selected configuration at block 1295 (i.e., create one or more zones according to the selected configuration).

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another via network interface (e.g., 1066) (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions stored in memory (e.g., 1064) may be provided to a processor(s) (e.g., 1063) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A system for reconfiguring rooms within an area in building automation comprising:

a plurality of environmental control equipment, each equipment being associated with a segment in a corresponding area to be reconfigured;

one or more controllers for monitoring and controlling environmental control equipment, each controller hosting one or more of a plurality of segments, wherein each segment of the plurality of segments comprises a segment input object, a segment setting object and a segment output object, and at least some of the plurality of segments include a segment control object executing a control program to control the environmental control equipment, the segment input object providing an input to the segment control object, the segment control object providing an input to the segment output object and the segment output object providing an output to control the environmental control equipment; and a user interface configured to receive an input from a user selecting at least two segments to create a room, wherein the at least two segments are configured to be evaluated according to a set of rules to determine whether the at least two segments as grouped together are compatible based at least in part upon determining that at least one of the at least two segments is a master segment, and further wherein the at least two segments are configured to work together in a master-slave configuration, wherein:

a master segment input object combines physical inputs from the master and slave segments to provide a single input to a master segment control object, and the master segment control object executes the control program to generate an output and provides the generated output to a master segment output object for distribution to the slave segment to enable synchronized control of environmental control equipment in the master and slave segments.

2. The system of claim 1, wherein the environmental control equipment includes one or more of light, blind, or heating, ventilation, and air conditioning (HVAC).

3. The system of claim 1, wherein a master segment setting object and a slave segment setting object share at least one setting associated with the environmental control equipment.

4. The system of claim 1, wherein the master segment output object distributes the generated output to a slave segment output object.

5. The system of claim 1, wherein the master segment input object combines physical inputs from the master and slave segments using an algorithm.

6. The system of claim 1, wherein the physical inputs comprise push buttons, sensors, or a combination thereof.

7. The system of claim 1, where the at least two segments are both capable of being the master segment.

8. The system of claim 1, wherein the slave segment does not include a segment control object.

9. A method of reconfiguring a room within an area in building automation comprising:

receiving from a user interface a user request to reconfigure the room within the area in a building, the user request comprising selection of at least two segments from a plurality of segments that comprise the area, wherein the selected segments each comprise at least one environmental control equipment, wherein the selected segments comprise one segment that is a master segment and at least one segment that is a slave segment;

determining, based on a set of rules, that the room is reconfigurable according to the user request, including determining whether two or more of the selected segments as grouped together are compatible based at least in part upon determining that at least one of the at least two segments is a master segment; and responsive to the user request, reconfiguring the room by:

combining physical inputs associated with the master and slave segments into a single input;

distributing output from a control program in the master segment to the slave segment; and combining settings between the master segment and the slave segment, wherein the reconfiguring implements a distributed control of the environmental control equipment in the master and slave segments.

10. The method of claim 9, wherein the set of rules includes verifying that the selected segments have a matching name, path and type.

11. The method of claim 9, wherein each selected segment comprises a segment input object, a segment output object, and a segment setting object, and the master segment further comprises a segment control object that includes the control program.

12. The method of claim 11, wherein the combining of the physical inputs into the single input is via the master segment input object.

13. The method of claim 12, wherein the combining is based on an algorithm.

14. The method of claim 13, wherein the algorithm is any one of "OR", "AND", average, maximum, minimum, toggle, or algorithm for people counting across segments.

15. The method of claim 13, wherein the algorithm applied is determined by at least one of the environmental control equipment or type of physical input.

16. The method of claim 12, wherein the physical inputs include sensors and push buttons.

17. The method of claim 11, wherein the distributing of output from the control program in the master segment to the slave segment is via a master segment output object and at least one slave segment output object.

18. A non-transitory computer-readable medium storing computer program code that, when executed by operation of one or more computer processors, performs an operation comprising:

receiving from a user interface a user request to reconfigure a room within an area in a building, the user request comprising selection of at least two segments from a plurality of segments in the area wherein the at least two segments are configured to be evaluated according to a set of rules to determine whether the at least two segments as grouped together are compatible based at least in part upon determining that at least one of the at least two segments is a master segment, and further wherein the selected segments each comprise at least one environmental control equipment, and wherein the selected segments comprise one segment that is a master segment and at least one segment that is a slave segment; and responsive to the user request, reconfiguring the room to synchronize operation of environment control equipment in the master and slave segments by:

combining physical inputs associated with the master and slave segments into a single input;

distributing output from a control program in the master segment to the slave segment; and combining settings between the master segment and the slave segment.

19. A method for zoning segments in building automation, comprising:

receiving a user request to group together at least a first segment and a second segment in a first zone, wherein the first and second segments each include both (i) at least one environmental control equipment and (ii) a set of objects, and further wherein the first segment is a master segment including a control program for controlling an environmental control equipment;

verifying the user request using one or more rules including determining whether the first segment and the second segment as grouped together are compatible based at least in part upon determining that at least one of the first segment and the second segment is a master segment; and automatically linking each object in the master segment to a corresponding object in the second segment to create the first zone within which the control program of the master segment provides a synchronized control of the environmental control equipment associated with the master segment and the second segment.

20. The method of claim 19, wherein the set of objects includes a segment input, a segment setting and a segment output.

21. The method of claim 20, wherein the one or more rules includes a rule that each of the segment input, segment setting, and segment output of the master segment be of the same type and have the same name and path as the corresponding segment input, segment setting and segment output of the second segment.

22. The method of claim 20, further comprising providing to the control program of the master segment a calculated input value representative of any physical input and settings associated with the master segment and the second segment.

23. The method of claim 22, further comprising providing an output value of the control program to the segment outputs in the master and second segments.

24. The method of claim 19, wherein the environmental control equipment includes one of light, blind or heating, ventilation and air conditioning (HVAC).

25. The method of claim 19, further comprising:

receiving a user request to add a new segment to the first zone, and in response to the user request:

verifying the user request using one or more rules, wherein the one or more rules includes a rule that each object in the new segment has the same type and path as the corresponding object in the existing segments in the first zone; and automatically linking each object in the new segment to the corresponding object in the master segment, wherein within the first zone the control program of the master segment provides a synchronized control of the environmental control equipment of the existing segments and the new segment.

26. The method of claim 19, further comprising:

receiving a user request to remove a selected segment from the first zone, and in response to the user request:

severing the link between the selected segment and the existing segments to create a standalone segment.

27. The method of claim 19, wherein the first and second segments are stored in one or more room controllers.

28. The method of claim 27, wherein the one or more room controllers are hosted by an automation server.

29. A system for zoning segments in building automation, comprising:

a server configured to:

receive a user request to group together at least a first segment and a second segment in a first zone;

a plurality of environmental control equipment, wherein each of the first and second segments includes at least one environmental control equipment from the plurality of environmental control equipment; and at least one controller communicatively coupled to the server, and configured to host at least one of the first and second segments;

wherein the first segment is a master segment which includes a control program for controlling an environmental control equipment, wherein each of the first and second segments includes a set of objects; and wherein the server is further configured to:

verify the user request using one or more rules including determining whether the first and second segments as grouped together are compatible based at least in part upon determining that at least one of the first and second segments is a master segment; and automatically link each object in the master segment to a corresponding object in the second segment to create the first zone within which the control program of the master segment provides a synchronized control of the environmental control equipment associated with the master segment and the second segment.

30. A non-transitory computer-readable medium storing computer program code that, when executed by operation of one or more computer processors, performs an operation comprising:

receiving a user request to group together at least a first segment and a second segment in a first zone, wherein the first and second segments each include both (i) at least one environmental control equipment and (ii) a set of objects, and further wherein the first segment is a master segment including a control program for controlling an environmental control equipment;

verifying the user request using one or more rules including determining whether the first and second segments as grouped together are compatible based at least in part upon determining that at least one of the first and second segments is a master segment; and automatically linking each object in the master segment to a corresponding object in the second segment to create the first zone within which the control program of the master segment provides a synchronized control of the environmental control equipment associated with the master segment and the second segment.

* * * * *